United States Patent
Kim et al.

(10) Patent No.: US 7,528,196 B2
(45) Date of Patent: May 5, 2009

(54) POLYALKENAMER COMPOSITIONS AND GOLF BALLS PREPARED THEREFROM

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 317 days.

(21) Appl. No.: 11/335,070

(22) Filed: Jan. 18, 2006

(65) Prior Publication Data

US 2006/0166762 A1 Jul. 27, 2006

Related U.S. Application Data

(60) Provisional application No. 60/706,562, filed on Aug. 8, 2005, provisional application No. 60/646,669, filed on Jan. 24, 2005.

(51) Int. Cl.
- *A63B 37/00* (2006.01)
- *A63B 37/12* (2006.01)
- *C08L 77/00* (2006.01)
- *C08L 23/00* (2006.01)

(52) U.S. Cl. ............ 525/184; 525/92 A; 525/177; 473/371; 473/374; 473/378

(58) Field of Classification Search ............ None
See application file for complete search history.

(56) References Cited

U.S. PATENT DOCUMENTS

| | | | |
|---|---|---|---|
| 3,804,803 A | 4/1974 | Streck et al. | |
| 3,974,092 A | 8/1976 | Streck et al. | |
| 4,115,475 A | 9/1978 | Foy et al. | |
| 4,123,061 A | 10/1978 | Dusbiber | |
| 4,153,772 A | 5/1979 | Schwesig et al. | |
| 4,183,876 A | 1/1980 | Coran et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,546,980 A | 10/1985 | Gendreau et al. | |
| 4,726,590 A | 2/1988 | Molitor | |
| 4,728,693 A | 3/1988 | Dröscher et al. | |
| 4,755,552 A | 7/1988 | Jadamus et al. | |
| 4,792,141 A | 12/1988 | Llort | |
| 4,838,556 A | 6/1989 | Sullivan | |
| 4,840,993 A | 6/1989 | Bartz | |
| 4,844,471 A | 7/1989 | Terence et al. | |
| 4,852,884 A | 8/1989 | Sullivan | |
| 4,894,411 A | 1/1990 | Okada et al. | |
| 4,950,826 A | 8/1990 | Zerpner et al. | |
| 4,955,966 A | 9/1990 | Yuki | |
| 5,334,673 A | 8/1994 | Wu | |
| 5,385,776 A | 1/1995 | Maxfield et al. | |
| 5,436,295 A | 7/1995 | Nishikawa et al. | |
| 5,460,367 A | 10/1995 | Horiuchi | |
| 5,948,862 A | 9/1999 | Sano et al. | |
| 5,959,059 A | 9/1999 | Vedula et al. | |
| 5,962,553 A | 10/1999 | Ellsworth | |
| 6,012,991 A | 1/2000 | Kim et al. | |
| 6,100,321 A | 8/2000 | Chen | |
| 6,180,722 B1 | 1/2001 | Dalton et al. | |
| 6,329,458 B1 | 12/2001 | Takesu et al. | |
| 6,426,387 B1 | 7/2002 | Kim | |
| 6,435,986 B1 | 8/2002 | Wu et al. | |
| 6,476,176 B1 | 11/2002 | Wu | |
| 6,485,378 B1 | 11/2002 | Boehm | |
| 6,508,724 B2 | 1/2003 | Dalton | |
| 6,562,906 B2 | 5/2003 | Chen | |
| 6,569,037 B2 | 5/2003 | Ichikawa et al. | |
| 6,582,326 B2 | 6/2003 | Wu et al. | |
| 6,616,552 B2 | 9/2003 | Takesue et al. | |
| 6,635,716 B2 | 10/2003 | Voorheis et al. | |
| 6,692,379 B2 | 2/2004 | Morgan et al. | |
| 6,762,244 B2 | 7/2004 | Rajogopalan et al. | |
| 6,770,360 B2 | 8/2004 | Mientus et al. | |

(Continued)

FOREIGN PATENT DOCUMENTS

| JP | 62267357 | * | 11/1987 |
|---|---|---|---|
| JP | 63221157 | * | 9/1988 |
| JP | 2001-218872 | | 8/2001 |
| JP | 2002-65896 A | | 3/2002 |

OTHER PUBLICATIONS

English Translation of Notice of Reasons for Rejection in Japanese Application No. 2006-014614, no date.
http://www.chemsoc.org/chembytes/ezine/2002/birkett_july02.htm (accessed on Nov. 1, 2006).
http://bppetrochemicals.com (accessed on Nov. 1, 2006) (http://bp.com/modularhome.do?categoryId=6110).
http://www.nml.csir.co.za/news/20020711/index1.htm. (accessed on May 29, 2007).
Research disclosure 29703, published in Jan. 1989.
English Translation of Notice of Reasons for Rejection, dispatched from the Japanese Patent Office on Oct. 22, 2008, from Japanese Patent Application No. 2006-014614.

*Primary Examiner*—David Buttner
(74) *Attorney, Agent, or Firm*—Klarquist Sparkman, LLP

(57) ABSTRACT

A golf ball that includes (a) a core comprising a center; (b) an outer cover layer; and (c) one or more intermediate layers; wherein at least one of the core, the outer cover layer, or the intermediate layer comprises a composition that includes (i) at least one polyalkenamer and at least one polyamide or (ii) at least one polyalkenamer. A method for making a golf ball comprising a core, one or more intermediate layers and an outer cover layer is also disclosed, wherein the method includes forming a blend comprising at least one polyalkenamer rubber and at least one polyamide; and injection molding the blend into a spherical mold to form the intermediate or outer cover layer. Also disclosed is a polymer composition that includes at least one polyalkenamer and at least one thermoplastic copolyamide elastomer.

29 Claims, 1 Drawing Sheet

U.S. PATENT DOCUMENTS

| | | |
|---|---|---|
| 6,776,942 B2 | 8/2004 | Kim |
| 6,794,447 B1 | 9/2004 | Kim et al. |
| 6,812,276 B2 | 11/2004 | Yeager |
| 6,835,146 B2 | 12/2004 | Jordan et al. |
| 6,861,474 B2 | 3/2005 | Kim |
| 6,878,075 B2 | 4/2005 | Kim |
| 6,905,423 B2 | 6/2005 | Morgan et al. |
| 6,930,150 B2 | 8/2005 | Kim |
| 6,960,629 B2 | 11/2005 | Voorheis et al. |
| 7,041,769 B2 | 5/2006 | Wu et al. |
| 2001/0005699 A1 | 6/2001 | Morgan et al. |
| 2001/0019971 A1 | 9/2001 | Hayashi et al. |
| 2002/0040111 A1* | 4/2002 | Rajagopalan ............... 525/425 |
| 2002/0045499 A1 | 4/2002 | Takemura et al. |
| 2003/0119989 A1 | 6/2003 | Ladd et al. |
| 2003/0158312 A1 | 8/2003 | Chen |
| 2003/0224871 A1 | 12/2003 | Kim et al. |
| 2004/0019138 A1* | 1/2004 | Voorheis et al. ............ 524/100 |
| 2004/0082408 A1* | 4/2004 | Sullivan et al. ............ 473/371 |
| 2004/0092336 A1 | 5/2004 | Kim et al. |
| 2004/0209708 A1 | 10/2004 | Bulpett et al. |
| 2004/0236030 A1 | 11/2004 | Kim et al. |
| 2005/0059756 A1 | 3/2005 | Kim et al. |
| 2008/0090678 A1* | 4/2008 | Kim et al. ................... 473/378 |

* cited by examiner

POLYALKENAMER COMPOSITIONS AND GOLF BALLS PREPARED THEREFROM

This application claims the benefit of U.S. Provisional Application No. 60/646,669, filed Jan. 24, 2005, and U.S. Provisional Application No. 60/706,562, filed Aug. 8, 2005, both of which are incorporated herein by reference in their entireties.

FIELD

In one embodiment, the present disclosure relates to a golf ball comprising a core, an outer cover layer and/or one or more inner cover layers, and where one or more of the core, outer cover layer or inner cover layers, comprise an injection moldable rubber composition. In one preferred embodiment, a golf ball is disclosed in which the outer cover layer comprises the injection moldable rubber composition. In another preferred embodiment, a golf ball is disclosed in which at least one intermediate layer comprises the injection moldable rubber composition. In another preferred embodiment, a golf ball is disclosed in which the core comprises the injection moldable rubber composition.

The present disclosure also relates to a new method of preparation of a golf ball comprising a core, an outer cover layer and/or one or more inner cover layers and where one or more of the core, outer cover layer and/or inner cover layers are prepared by injection molding a rubber composition. In one preferred embodiment, a method of preparation of a golf ball is disclosed in which the outer cover layer is prepared by injection molding a rubber composition. In another preferred embodiment, a method of preparation of a golf ball is disclosed in which at least one intermediate layer is prepared by injection molding a rubber composition. In another preferred embodiment, a method of preparation of a golf ball is disclosed in which the core is prepared by injection molding a rubber composition.

In a further embodiment the present disclosure relates to a golf ball comprising a core, an outer cover layer and/or one or more inner cover layers, and where one or more of the core, outer cover layer or inner cover layers, comprise a composition that includes at least one polyalkenamer and at least one polyamide. In one embodiment, a golf ball is disclosed in which the outer cover layer comprises the polyalkenamer/polyamide composition. In another embodiment, a golf ball is disclosed in which at least one intermediate layer comprises the polyalkenamer/polyamide composition. In another embodiment, a golf ball is disclosed in which the core comprises the polyalkenamer/polyamide composition.

The present disclosure also relates to a new method of preparation of a golf ball comprising a core, an outer cover layer and/or one or more inner cover layers and where one or more of the core, outer cover layer and/or inner cover layers are prepared by injection molding the polyalkenamer/polyamide composition. In one embodiment, a method of preparation of a golf ball is disclosed in which the outer cover layer is prepared by injection molding the polyalkenamer/polyamide composition. In another embodiment, a method of preparation of a golf ball is disclosed in which at least one intermediate layer is prepared by injection molding the polyalkenamer/polyamide composition. In another embodiment, a method of preparation of a golf ball is disclosed in which the core is prepared by injection molding the polyalkenamer/polyamide composition.

The present disclosure further relates to a composition that includes a polyalkenamer and a polyamide.

BACKGROUND

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but do not provide great distance because of relatively high spin and low velocity. Two-piece balls are made by molding a cover around a solid rubber core. These are the most popular types of balls in use today. In attempts to further modify the ball performance especially in terms of the distance such balls travel and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results and similarly if two additional layers are introduced between the core and outer cover layer, a so called "four-piece ball" results, and so on.

However, the starting point and key to the performance of any golf ball is the nature of the rubber compositions used in the construction of the golf ball, and in particular the rubber hardness, compression, resilience and durability. Most modern golf balls now utilize core compositions made from synthetic rubbers based on polybutadiene, especially cis-1,4-polybutadiene. In order to tailor the properties of the core, the polybutadiene is often further formulated with crosslinking agents, such as sulfur or peroxides, or by irradiation, as well as co-crosslinking agents such as zinc diacrylate. In addition, the weight and hardness of the core may be further adjusted by the incorporation of various filler materials in the rubber formulation. Thus, there is a great deal of literature concerning such formulation chemistry and the variation of the rubber composition and degree of cross linking such that cores may be produced with the required compression, resilience, hardness and durability.

For example, U.S. Pat. No. 4,726,590 discloses a composition for one-piece golf ball cores having improved resilience. The core composition includes the following components: an elastomer cross-linkable with a free radical initiator catalyst, a metal salt of an alpha-acrylate or methacrylate, a free radical initiator catalyst, and a polyfunctional isocyanate.

U.S. Pat. No. 4,838,556 discloses a solid golf ball having a solid core comprised of an elastomer or admixture of elastomers, at least one metal salt of an unsaturated carboxylic acid, a free radical initiator, and a dispersing agent. U.S. Pat. No. 4,852,884 discloses a golf ball core formulation, which incorporates a metal carbamate accelerator. U.S. Pat. No. 4,844,471 discloses a golf ball core composition including dialkyl tin fatty acid. Finally, U.S. Pat. No. 4,546,980 discloses a golf ball core, which contains two or more free radical initiators, at least two of which exhibit a different reactivity during the curing process.

Typically, the most common method for preparing and crosslinking the polybutadiene in such cores employs a compression molding process. This choice of molding method is dictated by the relatively high viscosity of the base polybutadiene at the crosslinking temperature, which must roughly correspond to the decomposition temperature of the chemical crosslinking agent. In view of the relatively high viscosity of cis 1,4-polybutadiene at the typical decomposition temperature of most commercially available peroxides, a compression molding process is the most commercially viable process for such core preparation. This process is preferred for such high viscosity compositions, as it does not require the material to flow into the mold; rather a slug comprising the mixture of polybutadiene, crosslinking agents, fillers and any other additives are placed in the open mold halves. The mold is then closed and the materials subjected to a molding cycle in which heat and pressure are applied while the mixture is confined within a mold. The compression and heat decompose the peroxide and/or other crosslinking agents, which in turn initiate cross-linking of the rubber. The temperature, pressure and duration of the molding cycle, in addition to the nature and relative amounts of rubber crosslinking agents and other fillers and additives, can all be independently varied to control the resulting core properties.

After core formation, the golf ball cover and any intermediate layers are typically positioned over the core using one of three methods: casting, injection molding, or compression molding. Injection molding generally involves using a mold having one or more sets of two hemispherical mold sections that mate to form a spherical cavity during the molding process. The pairs of mold sections are configured to define a spherical cavity in their interior when mated. When used to mold an outer cover layer for a golf ball, the mold sections can be configured so that the inner surfaces that mate to form the spherical cavity include protrusions configured to form dimples on the outer surface of the molded cover layer. When used to mold a layer onto an existing structure, such as a ball core, the mold includes a number of support pins disposed throughout the mold sections. The support pins are configured to be retractable, moving into and out of the cavity perpendicular to the spherical cavity surface. The support pins maintain the position of the core while the molten material flows through the gates into the cavity between the core and the mold sections. The mold itself may be a cold mold or a heated mold In contrast, compression molding of a ball cover or intermediate layer typically requires the initial step of making half shells by injection molding the layer material into an injection mold. The half shells then are positioned in a compression mold around a ball core, whereupon heat and pressure are used to mold the half shells into a complete layer over the core, with or without a chemical reaction such as crosslinking. Compression molding also can be used as a curing step after injection molding. In such a process, an outer layer of thermally curable material is injection molded around a core in a cold mold. After the material solidifies, the ball is removed and placed into a mold, in which heat and pressure are applied to the ball to induce curing in the outer layer.

Of the various cover molding processes, injection molding is most preferred, due to the efficiencies gained by its use including a more rapid cycle time, cheaper operating costs and an improved ability to produce thinner layers around the core and closely control any thickness variation. This latter advantage is becoming more important with the developments of multi-layered balls with two or more intermediate layers between the core and cover thus requiring thinner layer formation.

Like golf ball cores, golf ball covers and/or intermediate layers are sometimes made from rubber. Earlier balls almost exclusively had covers made from naturally occurring balata rubber. Many players still favor this cover material as its softness allows them to achieve spin rates sufficient to allow more precise control of ball direction and distance, particularly on shorter approach shots. However one deficiency of balata is the ease with which it is cut or sheared leading to low durability of the ball. Also, as with synthetic 1,4-polybutadiene rubber, balata rubber has relatively high viscosity at normal injection molding temperatures and thus is not easily adaptable to traditional thin layer-forming injection molding techniques. Thus the current evolution in golf balls technology favors the use of thermoplastic materials such as ionomers or thermoplastic polyurethane in golf ball covers and intermediate layers, which materials are much more amenable to modern thin layer injection molding techniques.

However, in addition to the polybutadiene-based synthetic rubbers, another synthetic rubber available for use in golf balls, are the so-called "polyalkenamers". These synthetic rubbers are unique in that in addition to a liner polymeric component they also contain a significant fraction of cyclic oligomer molecules, which in turn lowers their viscosity. Compounds of this class can be produced in accordance with the teachings of U.S. Pat. Nos. 3,804,803, 3,974,092 and 4,950,826, the entire contents of all of which are herein incorporated by reference.

To date, this material has been utilized primarily in blends with other polymers. For instance, U.S. Pat. No. 4,183,876 describes compositions comprising 15-95 parts by weight crystalline polyolefin resin and correspondingly 85-5 parts by weight cross-linked polyalkenamer rubber per 100 total parts by weight of resin and rubber. The resulting moldable thermoplastic compositions were said to exhibit improved strength and greater toughness and impact resistance than similar compositions containing substantially uncross-linked rubber. U.S. Pat. No. 4,840,993 describes a polyamide molding compound consisting of a mixture of 60 to 98% by weight of (A) a polyamide and (B) 2 to 40% by weight of a polyalkenamer, wherein the mixture is treated at elevated temperatures with 0.05 to 5% by weight of the sum of components (A) and (B) of an organic radical former. No mention was made of the use of such compositions in balls including golf balls.

However, there are a number of applications of polyalkenamer blends in game balls of various kinds. For example, U.S. Pat. No. 5,460,367 describes a pressureless tennis ball comprising a blend of trans-polyoctenamer rubber and natural rubber or other synthetic rubbers, e.g. cis-1,4-polybutadiene, trans-polybutadiene, polyisoprene, styrene-butadiene rubber, ethylene-propylene rubber or an ethylene-propylene-diene rubber (EPDM).

Also, U.S. Pat. No. 4,792,141 describes a golf ball comprising a core and a cover wherein the cover is formed from a composition comprising about 97 to about 60 parts balata and about 3 to about 40 parts by weight polyoctenylene rubber based on 100 parts by weight polymer in the composition. This patent also discloses that using more than about 40 parts by weight of polyoctenylene based on 100 parts by weight polymer in the composition has been found to produce deleterious effects.

However, it would be highly advantageous to have an injection moldable rubber composition with the soft feel of a rubber such as balata, but of sufficiently low viscosity to allow the material to be injection molded. It would also be highly advantageous if the properties of such a rubber composition could be tailored by similar formulation chemistry to that which has evolved through the use of crosslinked filled polybutadiene compositions used in core construction. In particular, it would be advantageous to have a composition that exhibits both superior toughness (e.g., durability) and high hardness. It would also be highly advantageous if such a composition could be used in a process to make a golf ball which process would include primarily injection molding to fabricate a core, outer cover and/or intermediate layer. It would also be highly advantageous if such a fabrication process would also allow formation of thin outer cover and/or intermediate layers, while also providing facile control not only of layer thickness and thickness uniformity, but while also allowing ease in variation of the resulting ball properties.

The present disclosure provides a golf ball comprising an injection moldable polyalkenamer rubber composition for use in a core, intermediate layers and/or outer cover layer of a golf ball. The present disclosure also provides a golf ball comprising a polyalkenamer/polyamide rubber composition for use in a core, intermediate layers and/or outer cover layer of a golf ball. The properties of the composition may be easily tailored for the particular golf ball component to be made by variation in the curative package employed and/or the molding conditions.

The present disclosure also provides processes for preparing a golf ball by injection molding one or more of the core, intermediate layers and/or outer cover layer of a golf ball. In one embodiment, the process utilizes a composition comprising a polyalkenamer rubber having a sufficiently low viscosity at and below normal peroxide decomposition temperatures to allow the material to be injection molded to form a core, intermediate and/or cover layer. In another embodiment, the process utilizes a composition comprising at least one polyalkenamer rubber having a sufficiently low viscosity to allow the material to be injection molded to form a core, intermediate and/or cover layer, and at least one polyamide.

SUMMARY

Disclosed herein are golf balls prepared from polyalkenamer/polyamide compositions, methods for making such golf balls and polyalkenamer/polyamide compositions. Also disclosed herein are golf balls prepared from polyalkenamer rubber compositions, and methods for making such compositions.

According to one embodiment, there is disclosed a golf ball comprising:
 (a) a core comprising a center;
 (b) an outer cover layer; and
 (c) one or more intermediate layers;
wherein at least one of the core, the outer cover layer, or the intermediate layer comprises a composition that includes at least one polyalkenamer and at least one polyamide.

According to another embodiment, there is disclosed a golf ball comprising:
 (a) a core; and
 (b) an outer cover layer;
wherein at least one of the core or the outer cover layer comprises a composition that includes at least one polyalkenamer and at least one polyamide.

In a further embodiment, there is disclosed a three piece golf ball comprising:
 (a) a core comprising a center;
 (b) an outer cover layer comprising a thermoplastic elastomer, a thermoset polyurethane, a thermoplastic polyurethane, a unimodal ionomer, a bimodal ionomer, a modified unimodal ionomer, a modified bimodal ionomer; or any and all combinations or mixtures thereof; and
 (c) an intermediate layer comprising an injection moldable composition comprising at least one polyalkenamer and at least about 10 weight percent of at least one polyamide, based on the total polymer amount of the intermediate layer.

Another embodiment disclosed herein is a four piece golf ball comprising:
 (a) a core comprising a center;
 (b) an outer cover layer comprising a thermoplastic elastomer, a thermoset polyurethane, a thermoplastic polyurethane, a unimodal ionomer, a bimodal ionomer, a modified unimodal ionomer, a modified bimodal ionomer; or any and all combinations or mixtures thereof;
 (c) an inner intermediate layer comprising a thermoplastic elastomer, a unimodal ionomer, a bimodal ionomer, a modified unimodal ionomer, a modified bimodal ionomer; or any and all combinations or mixtures thereof; and
 (d) an outer intermediate layer comprising an injection moldable composition comprising at least one polyalkenamer and at least about 10 weight percent of at least one polyamide, based on the total polymer amount of the intermediate layer.

Also disclosed herein is a polymer composition that includes at least one polyalkenamer and at least one thermoplastic copolyamide elastomer.

In one embodiment, a polymer composition may be prepared by forming a blend comprising at least one polyalkenamer rubber and at least one thermoplastic copolyamide elastomer.

A further aspect of the present disclosure concerns a method for making a golf ball comprising a core, one or more intermediate layers and an outer cover layer, wherein the method comprises:
 forming a blend comprising at least one polyalkenamer rubber and at least one polyamide; and
 injection molding the blend into a spherical mold to form the intermediate or outer cover layer.

According to a further embodiment, disclosed herein is a golf ball having:
 a. a core comprising a center;
 b. an outer cover layer; and
 c. an intermediate layer comprising an injection moldable polyalkenamer rubber composition, the injection moldable polyalkenamer rubber composition further comprising:
  i. at least one cross-linking agent selected from the group consisting of sulfur compounds, peroxides, azides, maleimides e-beam radiation, gamma—radiation, and all combinations thereof; or
  ii. at least one co-cross-linking agent comprising a zinc or magnesium salts of an unsaturated fatty acid having from 3 to 8 carbon atoms, or
  iii. at least one peptizer; or
  iv. at least one accelerator; or
  v. at least one filler; or
  vi. any and all combinations of i, ii, iii, iv, and v.

Also disclosed herein is a method for making a golf ball comprising a core, one or more intermediate layers and an outer cover layer, wherein said method comprises the steps of;
 1. forming a blend comprising a polyalkenamer rubber and one or more additional components selected from the group consisting of;
  a. at least one cross-linking agent selected from the group consisting of sulfur compounds, peroxides, azides, maleimides e-beam radiation, gamma-radiation, and all combinations thereof;

b. at least one co-cross-linking agent comprising a zinc or magnesium salts of an unsaturated fatty acid having from 3 to 8 carbon atoms, and c. any and all combinations of a and b; and 2. injection molding the blend of step 1 into a spherical mold to form the intermediate or outer cover layer wherein said mold is maintained at a temperature such that the desired amount of crosslinking of the polyalkenamer rubber occurs.

The foregoing and other features and advantages will become more apparent from the following detailed description, which proceeds with reference to the accompanying figures.

BRIEF DESCRIPTION OF THE DRAWINGS

Referring to the drawing in FIG. 1 there is illustrated a golf ball, 1, which comprises a solid center or core, 2, formed as a solid body of the herein described formulation and in the shape of the sphere, an intermediate layer, 3, disposed on the spherical core and an outer cover layer, 4.

Referring to the drawing in FIG. 2 there is illustrated a golf ball, 1, which comprises a solid center or core, 2, formed as a solid body of the herein described formulation and in the shape of the sphere, an inner intermediate layer, 3, disposed on the spherical core, an outer intermediate layer, 4, disposed on the inner intermediate layer, 3, and an outer cover layer, 5.

DETAILED DESCRIPTION

Figure 1:
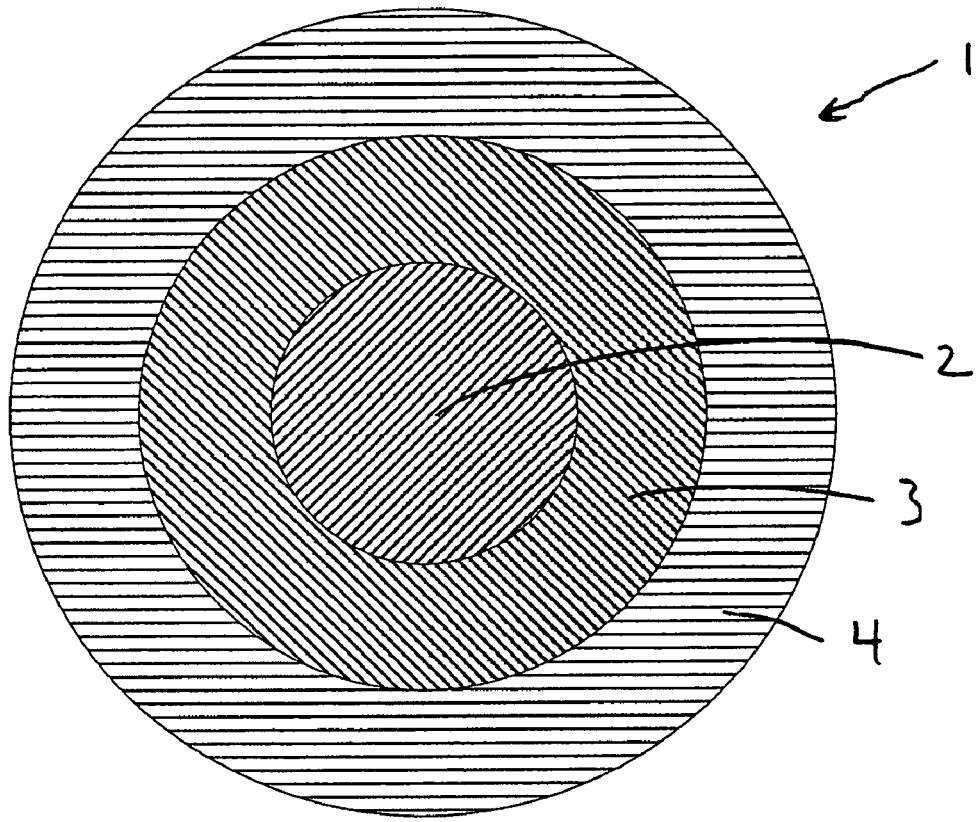
Figure 2:
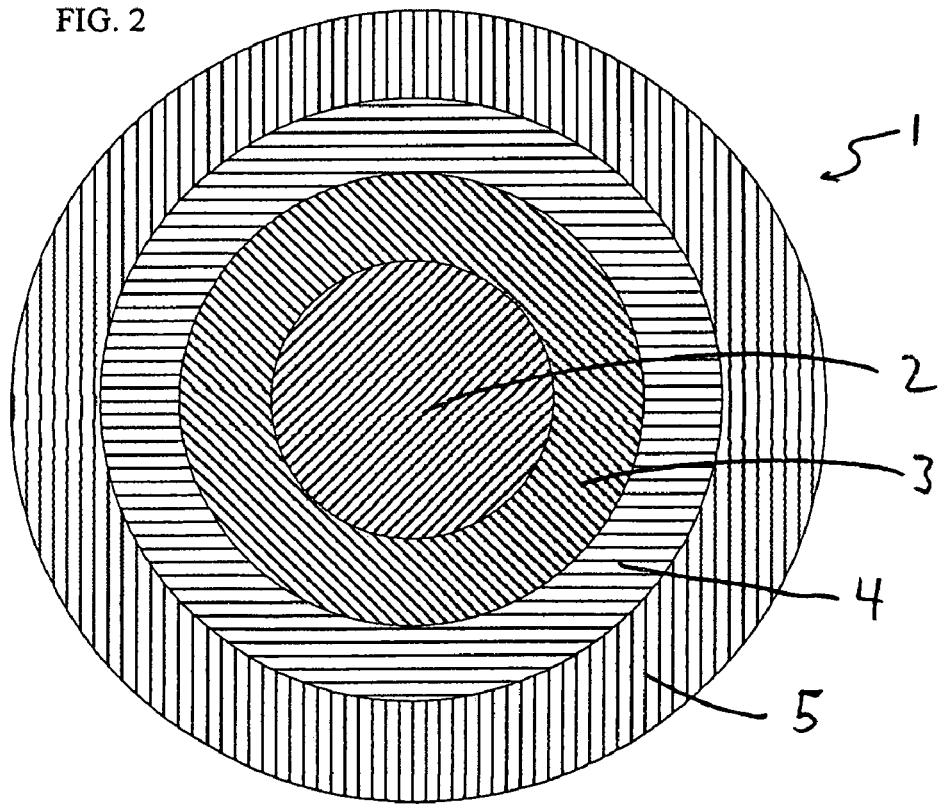

For ease of understanding, the following terms used herein are described below in more detail:

The term "(meth)acrylic acid copolymers" refers to copolymers of methacrylic acid and/or acrylic acid.

The term "(meth)acrylate" refers to an ester of methacrylic acid and/or acrylic acid.

The term "partially neutralized" refers to an ionomer with a degree of neutralization of less than 100 percent.

The term "hydrocarbyl" includes any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "core" refers to the elastic center of a golf ball, which may have a unitary construction. Alternatively the core itself may have a layered construction having a spherical "center" and additional "core layers", which such layers usually being made of the same material as the core center.

The term "cover" is meant to include any layer of a golf ball, which surrounds the core. Thus a golf ball cover may include both the outermost layer and also any intermediate layers, which are disposed between the golf ball center and outer cover layer. The term cover as used herein is used interchangeably with the term "cover layer".

The term "outer cover layer" refers to the outermost cover layer of the golf ball; this is the layer that is directly in contact with paint and/or ink on the surface of the golf ball and on which the dimple pattern is placed. If, in addition to the core, a golf ball comprises two or more cover layers, only the outermost layer is designated the outer cover layer, and the remaining layers are commonly designated intermediate layers as herein defined. The term outer cover layer as used herein is used interchangeably with the term "outer cover".

The term "intermediate layer" may be used interchangeably herein with the terms "mantle layer" or "inner cover layer" or "inner cover" and is intended to mean any layer(s) in a golf ball disposed between the core and the outer cover layer. The intermediate layer may be in the shape of a hollow, thin-skinned sphere that may or may not include inward or outward protrusions (e.g., the intermediate layer may be of substantially the same thickness around its entire curvature).

In the case of a ball with two intermediate layers, the term "inner intermediate layer" may be used interchangeably herein with the terms "inner mantle" or "inner mantle layer" and refers to the intermediate layer of the ball which is disposed nearest to the core.

Again, in the case of a ball with two intermediate layers, the term "outer intermediate layer" may be used interchangeably herein with the terms "outer mantle" or "outer mantle layer" and refers to the intermediate layer of the ball which is disposed nearest to the outer cover layer.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

Similarly the term "unimodal polymer" refers to a polymer comprising one main fraction and more specifically to the form of the polymer's molecular weight distribution curve, i.e., the molecular weight distribution curve for the total polymer product shows only a single maximum.

The term "polyalkenamer" is used interchangeably herein with the term "polyalkenamer rubber" and means a rubbery polymer of one or more cycloalkenes having from 5-20, preferably 5-15, most preferably 5-12 ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubbers used in the present disclosure exhibit excellent melt processability above their sharp melting temperatures and exhibit high miscibility with various rubber additives as a major component without deterioration of crystallinity which in turn facilitates injection molding. Thus, unlike synthetic rubbers typically used in golf ball preparation, injection molded parts of polyalkenamer-based compounds can be prepared which, in addition, can also be partially or fully crosslinked at elevated temperature. The crosslinked polyoctenamer compounds are highly elastic, and their mechanical and physical properties can be easily modified by adjusting the formulation.

As used herein, the term "injection moldable" as applied to the polyalkenamer rubber or polyalkenamer/polyamide compositions used as described herein refers to a material amenable to use in injection molding apparatus designed for use with typical thermoplastic resins. In one example, the term injection moldable composition as applied to the uncrosslinked polyalkenamer rubbers used in the present disclosure means compositions having a viscosity using a Dynamic Mechanical Analyzer (DMA) and ASTM D4440 at 200° C. of less than about 5,000 Pa-sec, preferably less than about 3,000 Pa-sec, more preferably less than about 2,000 Pa-sec and even more preferably less than about 1,000 Pa-sec. and a storage modulus (G') at 1 Hz measured using a Dynamic Mechanical Analyzer (DMA) and ASTM D4065, and ASTM D4440, at 25° C., and 1 Hz of greater than about $1 \times 10^7$ dyn/cm$^2$, preferably greater than about $1.5 \times 10^7$ dyn/cm$^2$, more preferably greater than about $1 \times 10^8$ dyn/cm$^2$, and most preferably greater than about $2 \times 10^8$ dyn/cm$^2$.

The term "polyamide" includes both homopolyamides and copolyamides.

The above term descriptions are provided solely to aid the reader, and should not be construed to have a scope less than that understood by a person of ordinary skill in the art or as limiting the scope of the appended claims.

The singular terms "a," "an," and "the" include plural referents unless context clearly indicates otherwise. The word "comprises" indicates "includes." It is further to be understood that all molecular weight or molecular mass values given for compounds are approximate, and are provided for description. The materials, methods, and examples are illustrative only and not intended to be limiting. Unless otherwise indicated, description of components in chemical nomenclature refers to the components at the time of addition to any combination specified in the description, but does not necessarily preclude chemical interactions among the components of a mixture once mixed.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc., are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The polyalkenamer/polyamide composition surprisingly exhibits superior characteristics over a broad spectrum of properties that relate to the effectiveness of a composition for use in a golf ball. For example, the composition exhibits superior impact durability and Coefficient of Restitution (COR) in a pre-determined hardness range (e.g., a hardness Shore D of from about 30 to about 85, preferably from about 40 to about 80, and more preferably from about 40 to about 75). More particularly, the compositions disclosed herein exhibit excellent hardness adjustment without significantly compromising COR or processability. In other words, the hardness (rigidness) of polyamide compositions typically is too great for use as a major or primary ingredient in a golf ball composition, but it has been discovered that by adding a polyalkenamer to the polyamide composition the hardness can be lowered without significantly compromising COR or processability.

A surprising aspect of the disclosed compositions is that combining the polyamide with the polyalkenamer does not decrease the COR significantly. Typically, it would have been expected that blending polyamide with other polymeric component(s) would significantly decrease the COR.

Unlike synthetic rubbers typically used in golf ball preparation, injection molded parts of polyalkenamer/polyamide-based compositions can be prepared which, in addition, can also be partially, fully crosslinked, or annealed at elevated temperature. The crosslinked or thermally treated polyalkenamer/polyamide compositions are highly elastic, and their mechanical and physical properties can be easily modified by adjusting the formulation.

The presently disclosed compositions can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.670 inches to about 1.800 inches or about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the disclosure.

The present disclosure relates to a golf ball comprising a core, a cover layer and, optionally, one or more inner cover layers and where one or more of the core, cover layer or inner cover layers comprises a polyalkenamer/polyamide rubber composition. In one preferred embodiment, a golf ball is disclosed in which the cover layer comprises the polyalkenamer/polyamide rubber composition. In another preferred embodiment, a golf ball is disclosed in which at least one intermediate layer comprises the polyalkenamer/polyamide rubber composition. In another preferred embodiment, a golf ball is disclosed in which the core comprises the polyalkenamer/polyamide rubber composition.

The polyalkenamer/polyamide composition used to prepare the golf ball contains from about 2 to about 90 wt %, preferably from about 5 to about 80 wt %, more preferably from about 7 to 70 wt %, and even more preferably from about 10 to 60 wt % (based on the final weight of the injection moldable composition) of one or more polyalkenamer polymers, particularly polyalkenamers of a cycloalkene having from 5-20, preferably 5-15, and most preferably 5-12 ring carbon atoms. The polyalkenamers may be prepared by ring opening metathesis polymerization of one or more cycloalkenes in the presence of organometallic catalysts as described in U.S. Pat. Nos. 3,492,245, and 3,804,803, the entire contents of both of which are herein incorporated by reference.

The polyalkenamer/polyamide composition used to prepare the golf ball also contains from about 10 to about 98 wt %, preferably from about 20 to about 95 wt %, more preferably from about 30 to 93 wt %, and even more preferably from about 40 to 90 wt % (based on the final weight of the injection moldable composition) of one or more polyamide polymers.

According to certain embodiments, the polyalkenamer/polyamide composition contains at least about 60 wt %, preferably at least about 70 wt %, and more preferably at least about 80 wt % of at least one polyamide, based on the total polymer amount of the layer(s) or core that is made from the polyalkenamer/polyamide composition. In further embodiments, the polyamide ingredient of the polyalkenamer/polyamide composition is the major ingredient of the material used to form at least one component (e.g., the core or inner cover layer) of the golf ball. As used herein "major ingredient" means that the polyamide is present in an amount of at least about 50 wt %, based on the total weight of all the ingredients in the material.

In another embodiment disclosed herein, there is a golf ball comprising a core, a cover layer and, optionally, one or more inner cover layers and where one or more of the core, cover layer or inner cover layers comprises an injection moldable rubber composition. In one preferred embodiment, a golf ball is disclosed in which the cover layer comprises the injection moldable rubber composition. In another preferred embodiment, a golf ball is disclosed in which at least one intermediate layer comprises the injection moldable rubber composition. In another preferred embodiment, a golf ball is disclosed in which the core comprises the injection moldable rubber composition.

In a further embodiment, the injection moldable composition used to prepare the golf ball contains from about 1 to 100 wt %, preferably from about 20 to 100 wt %, more preferably from about 40 to 100 wt % or 45 to 100 wt %, and even more preferably from about 60 to 100 wt % or 75 to 100 wt % (based on the final weight of the injection moldable composition) of one or more polyalkenamer polymers of a cycloalkene having from 5-20, preferably 5-15, and most preferably 5-12 ring carbon atoms.

Illustrative polyamides for use in the polyalkenamer/polyamide compositions include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12,CX; PA12, IT; PPA; PA6, IT; and PA6/PPE.

The polyamide may be any homopolyamide or copolyamide. One example of a group of suitable polyamides are thermoplastic polyamide elastomers. Thermoplastic polyamide elastomers typically are copolymers of a polyamide and polyester or polyether. For example, the thermoplastic polyamide elastomer can contain a polyamide (Nylon 6, Nylon 66, Nylon 11, Nylon 12 and the like) as a hard segment and a polyether or polyester as a soft segment. In one specific example, the thermoplastic polyamides are amorphous copolyamides based on polyamide (PA 12).

One class of copolyamide elastomers are polyether amide elastomers. Illustrative examples of polyether amide elastomers are those that result from the copolycondensation of polyamide blocks having reactive chain ends with polyether blocks having reactive chain ends, including:

(1) polyamide blocks of diamine chain ends with polyoxyalkylene sequences of dicarboxylic chains;

(2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and (3) polyamide blocks of dicarboxylic chain ends with polyether diols, the products obtained, in this particular case, being polyetheresteramides.

More specifically, the polyamide elastomer can be prepared by polycondensation of the components (i) a diamine and a dicarboxylate, lactames or an amino dicarboxylic acid (PA component), (ii) a polyoxyalkylene glycol such as polyoxyethylene glycol, polyoxy propylene glycol (PG component) and (iii) a dicarboxylic acid.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences is preferably between about 300 and 15,000, and more preferably between about 600 and 5,000. The molecular weight of the polyether sequences is preferably between about 100 and 6,000, and more preferably between about 200 and 3,000.

The amide block polyethers may also comprise randomly distributed units. These polymers may be prepared by the simultaneous reaction of polyether and precursor of polyamide blocks. For example, the polyether diol may react with a lactam (or alpha-omega amino acid) and a diacid which limits the chain in the presence of water. A polymer is obtained that has primarily polyether blocks and/or polyamide blocks of very variable length, but also the various reactive groups that have reacted in a random manner and which are distributed statistically along the polymer chain.

Suitable amide block polyethers include those as disclosed in U.S. Pat. Nos. 4,331,786; 4,115,475; 4,195,015; 4,839,441; 4,864,014; 4,230,848 and 4,332,920.

The polyether may be, for example, a polyethylene glycol (PEG), a polypropylene glycol (PPG), or a polytetramethylene glycol (PTMG), also designated as polytetrahydrofurane (PTHF). The polyether blocks may be along the polymer chain in the form of diols or diamines. However, for reasons of simplification, they are designated PEG blocks, or PPG blocks, or also PTMG blocks.

The polyether block comprises different units such as units which derive from ethylene glycol, propylene glycol, or tetramethylene glycol.

The amide block polyether comprises at least one type of polyamide block and one type of polyether block. Mixing of two or more polymers with polyamide blocks and polyether blocks may also be used. The amide block polyether also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of 1/1 to 3/1.

One type of polyetherester elastomer is the family of Pebax, which are available from Elf-Atochem Company. Preferably, the choice can be made from among Pebax 2533, 3533, 4033, 1205, 7033 and 7233. Blends or combinations of Pebax 2533, 3533, 4033, 1205, 7033 and 7233 can also be prepared, as well. Pebax 2533 has a hardness of about 25 shore D (according to ASTM D-2240), a Flexural Modulus of 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of 67 kpsi (according to ASTM D-790). Pebax 7333 has a hardness of about 72 shore D (according to ASTM D-2240) and a Flexural Modulus of 107 kpsi (according to ASTM D-790).

Some examples of suitable polyamides for use in the polyalkenamer/polyamide compositions include those commercially available under the tradenames PEBAX, CRISTAMID and RILSAN marketed by Atofina Chemicals of Philadelphia, Pa., GRIVORY and GRILAMID marketed by EMS Chemie of Sumter, S.C., TROGAMID and VESTAMID available from Degussa, and ZYTEL marketed by E.I. DuPont de Nemours & Co., of Wilmington, Del.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer has a trans content of approximately 80%, however, compounds having other ratios of the cis- and trans-isomeric forms of the polyalkenamer can also be obtained by blending available products for use in making the composition.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5 to about 70, preferably from about 6 to about 50, more preferably from about from 6.5 to about 50%, even more preferably from about from 7 to about 45%, More preferably, the polyalkenamer rubber is a polymer prepared by polymerization of cyclooctene to form a trans-polyoctenamer rubber as a mixture of linear and cyclic macromolecules.

Prior to its use in golf balls, the polyalkenamer rubber or the polyalkenamer/polyamide composition may be further formulated with one or more of the following blend components:

A. Cross-Linking Agents

Any crosslinking or curing system typically used for rubber crosslinking may be used to crosslink the polyalkenamer rubber and/or polyamide. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the disclosed compositions can be brought about by applying thermal energy, shear, irradiation, reaction with other chemicals, or any combination of these. Both homolytically and heterolytically decomposed peroxide can be used. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl) peroxide.

The cross-linking agents can be blended in total amounts of about 0.01 part to about 5 parts, more preferably about 0.05 part to about 4 parts, and most preferably about 0.1 part to about 2 parts, by weight of the cross-linking agents per 100 parts by weight of the polyalkenamer/polyamide composition. The cross-linking agent(s) may be mixed into or with the polyalkenamer/polyamide blend, or the cross-linking agent(s) may be pre-mixed with the polyalkenamer or polyamide component prior to the compounding of polyalkenamer or polyamide components.

In a further embodiment, the cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the polyalkenamer rubber.

Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hour has a decomposition temperature of 138° C. and 2,5-dimethyl-2,5-di-(t-butylperoxy)hexyne-3 at $t_{1/2}$=0.1 hour has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the polyalkenamer rubber/polyamide composition, or polyalkenamer rubber composition, to radiation also can serve as a cross-linking agent. Radiation can be applied to the polyalkenamer rubber/polyamide mixture by any known method, including using microwave or gamma radiation, or an electron beam device. Additives may also be used to improve radiation-induced crosslinking of the polyalkenamer rubber/polyamide composition or polyalkenamer rubber composition.

B. Co-Cross-Linking Agent

The polyalkenamer rubber/polyamide composition, or polyalkenamer rubber composition, may also be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in the polyalkenamer rubber/polyamide composition, or polyalkenamer rubber composition, either as a preformed metal salt, or by introducing an $\alpha,\beta$-unsaturated carboxylic acid and a metal oxide or hydroxide into the polyalkenamer rubber/polyamide composition or polyalkenamer rubber composition, and allowing them to react to form the metal salt. The unsaturated carboxylic acid metal salt can be blended in any desired amount, but preferably in amounts of about 1 part to about 100 parts by weight of the unsaturated carboxylic acid per 100 parts by weight of the polyalkenamer rubber/polyamide composition, or polyalkenamer rubber composition.

C. Peptizer

The polyalkenamer rubber/polyamide compositions, or polyalkenamer rubber composition, may also incorporate one or more of the so-called "peptizers".

The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl)disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

For example, ammonium pentachlorothiophenol can be made from pentachlorothiophenol (purchased from Dannier Chemicals), which is suspended in para-xylene (100 g in 250 ml). The suspension is stirred, warmed to 35° C. To this suspension, 1 molar equivalent of concentrated aqueous ammonium hydroxide is added and allowed to react for 5 minutes with stirring. Upon addition of ammonium hydroxide, the suspension immediately changes color from a green grey to a yellow orange color. On cooling the resulting suspended ammonium pentachlorothiophenol is then isolated by filtration, washed with xylene and dried under vacuum at room temperature for 72 hours. Zinc pentachlorothiophenol may be purchased from Dannier Chemicals.

The peptizer, if employed in the golf balls, is present in an amount of from about 0.01 to about 10, preferably of from about 0.05 to about 7, more preferably of from about 0.1 to about 5 parts by weight per 100 parts by weight of the polyalkenamer rubber/polyamide component.

D. Accelerators

The polyalkenamer rubber/polyamide composition, or polyalkenamer rubber composition, can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook*. 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polyalkenamer rubber/polyamide composition, or polyalkenamer rubber composition, can further incorporate from about 0.01 part to about 10 parts by weight of the accelerator per 100 parts by weight of the polyalkenamer rubber/polyamide composition. More preferably, the ball composition can further incorporate from about 0.02 part to about 5 parts, and most preferably from about 0.03 part to about 1.5 parts, by weight of the accelerator per 100 parts by weight of the polyalkenamer rubber.

Additional Polymer Components

The polyalkenamer rubber/polyamide composition, or polyalkenamer rubber composition, used in the core, outer cover layer and/or one or more intermediate layers golf ball may be further blended with additional polymers prior to molding. Also, any of the core, outer cover layer and/or one or more intermediate layers of the balls, if not containing the polyalkenamer/polyamide composition (or polyalkenamer rubber composition), may comprise one or more of the following additional polymers.

Such additional polymers include synthetic and natural rubbers, thermoset polymers such as thermoset polyurethanes and thermoset polyureas, as well as thermoplastic polymers including thermoplastic elastomers such as unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyesters, copolyesters, polycarbonates, polyolefins, polyphenylene oxide, polyphenylene sulfide, diallyl phthalate polymer, polyimides, polyvinyl chloride, polyamide-ionomer, polyurethane-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane and any and all combinations thereof. One example is Paraloid EXL 2691A which is a methacrylate-butadiene-styrene (MBS) impact modifier available from Rohm & Haas Co.

More particularly, the synthetic and natural rubber polymers may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

Examples of olefinic thermoplastic elastomers include metallocene-catalyzed polyolefins, ethylene-octene copolymer, ethylene-butene copolymer, and ethylene-propylene copolymers all with or without controlled tacticity as well as blends of polyolefins having ethyl-propylene-non-conjugated diene terpolymer, rubber-based copolymer, and dynamically vulcanized rubber-based copolymer. Examples of these include products sold under the trade names SANTOPRENE, DYTRON, VISAFLEX, and VYRAM by Advanced Elastomeric Systems of Houston, Tex., and SARLINK by DSM of Haarlen, the Netherlands.

Examples of rubber-based thermoplastic elastomers include multiblock rubber-based copolymers, particularly those in which the rubber block component is based on butadiene, isoprene, or ethylene/butylene. The non-rubber repeating units of the copolymer may be derived from any suitable monomers, including meth(acrylate)esters, such as methyl methacrylate and cyclohexylmethacrylate, and vinyl arylenes, such as styrene. Examples of styrenic copolymers are resins manufactured by Kraton Polymers (formerly of Shell Chemicals) under the trade names KRATON D (for styrene-butadiene-styrene and styrene-isoprene-styrene types) and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corp.

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

Examples of other thermoplastic elastomers suitable as additional polymer components include those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly (ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block.

Other preferred materials suitable for use as an additional polymers in the presently disclosed compositions include polyester thermoplastic elastomers marketed under the tradename SKYPEL™ by SK Chemicals of South Korea, or diblock or triblock copolymers marketed under the tradename SEPTON™ by Kuraray Corporation of Kurashiki, Japan, and KRATON™ by Kraton Polymers Group of Companies of Chester, United Kingdom. For example, SEPTON HG 252 is a triblock copolymer, which has polystyrene end blocks and a hydrogenated polyisoprene midblock and has hydroxyl groups at the end of the polystyrene blocks. HG-252 is commercially available from Kuraray America Inc. (Houston, Tex.).

Another example of an additional polymer component includes the thermoplastic polyurethanes, which are the reaction product of a diol or polyol and an isocyanate, with or without a chain extender. Isocyanates used for making the urethanes encompass diisocyanates and polyisocyanates. Examples of suitable isocyanates include the following: trimethylene diisocyanate, tetramethylene diisocyanate, pentamethylene diisocyanate, hexamethylene diisocyanate, ethylene diisocyanate, diethylidene diisocyanate, propylene diisocyanate, butylene diisocyanate, bitolylene diisocyanate, tolidine isocyanate, isophorone diisocyanate, dimeryl diisocyanate, dodecane-1,12-diisocyanate, 1,10-decamethylene diisocyanate, cyclohexylene-1,2-diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis (isocyanatomethyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis (isocyanatomethyl) cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, meta-xylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianisidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, polybutylene diisocyanate, isocyanurate modified compounds, and carbodiimide modified compounds, as well as biuret modified compounds of the above polyisocyanates. Each isocyanate may be used either alone or in combination with one or more other isocyanates. These isocyanate mixtures can include triisocyanates, such as biuret of hexamethylene diisocyanate and triphenylmethane triisocyanate, and polyisocyanates, such as polymeric diphenylmethane diisocyanate.

Polyols used for making the polyurethane in the copolymer include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids. Adipic acid is used for materials requiring added flexibility, whereas phthalic anhydride is used for those requiring rigidity. Some examples of polyester polyols include poly(ethylene adipate) (PEA), poly (diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyol may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which is an active hydride. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture.

Polycarbonate polyol is obtained by the condensation of a known polyol (polyhydric alcohol) with phosgene, chloroformic acid ester, dialkyl carbonate or diallyl carbonate. A particularly preferred polycarbonate polyol contains a polyol component using 1,6-hexanediol, 1,4-butanediol, 1,3-butanediol, neopentylglycol or 1,5-pentanediol. A polycarbonate polyol can be used either alone or in a mixture.

Polybutadiene polyol includes liquid diene polymer containing hydroxyl groups, and an average of at least 1.7 functional groups, and may be composed of diene polymer or diene copolymer having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture.

As stated above, the urethane also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Suitable polyamines that may be used as chain extenders include primary, secondary and tertiary amines; polyamines have two or more amines as functional groups. Examples of these include: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol. Aromatic diamines have a tendency to provide a stiffer product than aliphatic or cycloaliphatic diamines. A chain extender may be used either alone or in a mixture.

In yet another embodiment, a blend of an ionomer and a block copolymer can be included in the composition that includes the polyalkenamer rubber or polyalkenamer/polyamide, or the blend of an ionomer and a block copolymer can be included in a core or layer that does not include the polyalkenamer rubber to polyalkenamer/polyamide composition. The blend of an ionomer and a block copolymer can be particularly included in the mantle layer. An example of a block copolymer is a functionalized styrenic block copolymer, the block copolymer incorporating a first polymer block having an aromatic vinyl compound, a second polymer block having a conjugated diene compound, and a hydroxyl group located at a block copolymer, or its hydrogenation product, in which the ratio of block copolymer to ionomer ranges from 5:95 to 95:5 by weight, more preferably from about 10:90 to about 90:10 by weight, more preferably from about 20:80 to about 80:20 by weight, more preferably from about 30:70 to about 70:30 by weight and most preferably from about 35:65 to about 65:35 by weight. A preferred block copolymer is SEPTON HG-252. Such blends are described in more detail in commonly-assigned U.S. Pat. No. 6,861,474 and U.S. Patent publication No. 2003/0224871 both of which are incorporated herein by reference in their entireties.

In a further embodiment, the core, mantle and/or cover layers (and particularly a mantle layer) can comprise a composition prepared by blending together at least three materials, identified as Components A, B, and C, and melt-processing these components to form in-situ a polymer blend composition incorporating a pseudo-crosslinked polymer network. Such blends are described in more detail in commonly-assigned U.S. Pat. No. 6,930,150, which is incorporated by reference herein in its entirety. Component A is a monomer, oligomer, prepolymer or polymer that incorporates at least five percent by weight of at least one type of an anionic functional group, and more preferably between about 5% and 50% by weight. Component B is a monomer, oligomer, or polymer that incorporates less by weight of anionic functional groups than does Component A, Component B preferably incorporates less than about 25% by weight of anionic functional groups, more preferably less than about 20% by weight, more preferably less than about 10% by weight, and most preferably Component B is free of anionic functional groups. Component C incorporates a metal cation, preferably as a metal salt. The pseudo-crosslinked network structure is formed in-situ, not by covalent bonds, but instead by ionic clustering of the reacted functional groups of Component A. The method can incorporate blending together more than one of any of Components A, B, or C.

The polymer blend can include either Component A or B dispersed in a phase of the other. Preferably, blend compositions comprises between about 1% and about 99% by weight of Component A based on the combined weight of Components A and B, more preferably between about 10% and about 90%, more preferably between about 20% and about 80%, and most preferably, between about 30% and about 70%. Component C is present in a quantity sufficient to produce the preferred amount of reaction of the anionic functional groups of Component A after sufficient melt-processing. Preferably, after melt-processing at least about 5% of the anionic functional groups in the chemical structure of Component A have been consumed, more preferably between about 10% and about 90%, more preferably between about 10% and about 80%, and most preferably between about 10% and about 70%.

The composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the anionic functional group of Component A is dispersed evenly throughout the mixture. Next, reaction is made to take place in-situ at the site of the anionic functional groups of Component A with Component C in the presence of Component B. This reaction is prompted by addition of heat to the mixture. The reaction results in the formation of ionic clusters in Component A and formation of a pseudo-crosslinked structure of Component A in the presence of Component B. Depending upon the structure of Component B, this pseudo-crosslinked Component A can combine with Component B to form a variety of interpenetrating network structures. For example, the materials can form a pseudo-crosslinked network of Component A dispersed in the phase of Component B, or Component B can be dispersed in the phase of the pseudo-crosslinked network of Component A. Component B may or may not also form a network, depending upon its structure, resulting in either: a fully-interpenetrating network, i.e., two independent networks of Components A and B penetrating each other, but not covalently bonded to each other; or, a semi-interpenetrating network of Components A and B, in which Component B forms a linear, grafted, or branched polymer interspersed in the network of Component A. For example, a reactive functional group or an unsaturation in Component B can be reacted to form a crosslinked structure in the presence of the in-situ-formed, pseudo-crosslinked structure of component A, leading to formation of a fully-interpenetrating network. Any anionic functional groups in Component B also can be reacted with the metal cation of Component C, resulting in pseudo-crosslinking via ionic cluster attraction of Component A to Component B.

The level of in-situ-formed pseudo-crosslinking in the compositions formed by the present methods can be controlled as desired by selection and ratio of Components A and B, amount and type of anionic functional group, amount and type of metal cation in Component C, type and degree of chemical reaction in Component B, and degree of pseudo-crosslinking produced of Components A and B.

As discussed above, the mechanical and thermal properties of the polymer blend for the inner mantle layer and/or the outer mantle layer can be controlled as required by a modifying any of a number of factors, including: chemical structure of Components A and B, particularly the amount and type of anionic functional groups; mean molecular weight and molecular weight distribution of Components A and B; linearity and crystallinity of Components A and B; type of metal cation in component C; degree of reaction achieved between the anionic functional groups and the metal cation; mix ratio of Component A to Component B; type and degree of chemical reaction in Component B; presence of chemical reaction, such as a crosslinking reaction, between Components A and B; and the particular mixing methods and conditions used.

As discussed above, Component A can be any monomer, oligomer, prepolymer, or polymer incorporating at least 5% by weight of anionic functional groups. Those anionic functional groups can be incorporated into monomeric, oligomeric, prepolymeric, or polymeric structures during the synthesis of Component A, or they can be incorporated into a pre-existing monomer, oligomer, prepolymer, or polymer through sulfonation, phosphonation, or carboxylation to produce Component A.

Preferred, but non-limiting, examples of suitable copolymers and terpolymers include copolymers or terpolymers of: ethylene/acrylic acid, ethylene/methacrylic acid, ethylene/itaconic acid, ethylene/methyl hydrogen maleate, ethylene/maleic acid, ethylene/methacrylic acid/ethylacrylate, ethylene/itaconic acid/methyl metacrylate, ethylene/methyl hydrogen maleate/ethyl acrylate, ethylene/methacrylic acid/vinyl acetate, ethylene/acrylic acid/vinyl alcohol, ethylene/propylene/acrylic acid, ethylene/styrene/acrylic acid, ethylene/methacrylic acid/acrylonitrile, ethylene/fumaric acid/vinyl methyl ether, ethylene/vinyl chloride/acrylic acid, ethylene/vinyldiene chloride/acrylic acid, ethylene/vinyl fluoride/methacrylic acid, and ethylene/chlorotrifluoroethylene/methacrylic acid, or any metallocene-catalyzed polymers of the above-listed species.

Another family of thermoplastic elastomers for use in the golf balls are polymers of i) ethylene and/or an alpha olefin; and ii) an $\alpha$, $\beta$-ethylenically unsaturated $C_3$-$C_{20}$ carboxylic acid or anhydride, or an $\alpha$, $\beta$-ethylenically unsaturated $C_3$-$C_{20}$ sulfonic acid or anhydride or an $\alpha$, $\beta$-ethylenically unsaturated $C_3$-$C_{20}$ phosphoric acid or anhydride and, optionally iii) a $C_1$-$C_{10}$ ester of an $\alpha$, $\beta$-ethylenically unsaturated $C_3$-$C_{20}$ carboxylic acid or a $C_1$-$C_{10}$ ester of an $\alpha$, $\beta$-ethylenically unsaturated $C_3$-$C_{20}$ sulfonic acid or a $C_1$-$C_{10}$ ester of an $\alpha$, $\beta$-ethylenically unsaturated $C_3$-$C_{20}$ phosphoric acid.

Preferably, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred. Preferably, the carboxylic acid ester of if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of such polymers suitable for use as include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl (meth)acrylate terpolymers, or ethylene and/or propylene maleic anhydride copolymers and terpolymers.

The acid content of the polymer may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich.

Also included are the bimodal ethylene/carboxylic acid polymers as described in U.S. Pat. No. 6,562,906. These polymers comprise ethylene/$\alpha$, $\beta$-ethylenically unsaturated $C_{3-8}$ carboxylic acid high copolymers, particularly ethylene (meth)acrylic acid copolymers and ethylene, alkyl (meth) acrylate, (meth)acrylic acid terpolymers, having molecular weights of about 80,000 to about 500,000 which are melt blended with ethylene/$\alpha$, $\beta$-ethylenically unsaturated $C_{3-8}$ carboxylic acid copolymers, particularly ethylene/(meth) acrylic acid copolymers having molecular weights of about 2,000 to about 30,000.

As discussed above, Component B can be any monomer, oligomer, or polymer, preferably having a lower weight percentage of anionic functional groups than that present in Component A in the weight ranges discussed above, and most preferably free of such functional groups. Examples of suitable materials for Component B include, but are not limited to, the following: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyvinyl alcohols, acrylonitrile-butadiene-styrene copolymers, polyurethane, polyarylate, polyacrylate, polyphenyl ether, modified-polyphenyl ether, high-impact polystyrene, diallyl phthalate polymer, metallocene catalyzed polymers, acrylonitrile-styrene-butadiene (ABS), styrene-acrylonitrile (SAN) (including olefin-modified SAN and acrilonitrile styrene acrylonitrile), styrene-maleic anhydryde (S/MA) polymer, styrenic copolymer, functionalized styrenic copolymer, functionalized styrenic terpolymer, styrenic terpolymer, cellulose polymer, liquid crystal polymer (LCP), ehtylene-propylene-diene terpolymer (EPDM), ethylene-propylene copolymer, ethylene vinyl acetate, polyurea, and polysiloxane or any metallocene-catalyzed polymers of these species. Particularly suitable polymers for use as Component B include polyethylene-terephthalate, polybutyleneterephthalate, polytrimethylene-terephthalate, ethylene-carbon monoxide copolymer, polyvinyl-diene fluorides, polyphenylene-sulfide, polypropyleneoxide, polyphenyloxide, polypropylene, functionalized polypropylene, polyethylene, ethylene-octene copolymer, ethylene-methyl acrylate, ethylene-butyl acrylate, polycarbonate, polysiloxane, functionalized polysiloxane, copolymeric ionomer, terpolymeric ionomer, polyetherester elastomer, polyesterester elastomer, polyetheramide elastomer, propylene-butadiene copolymer, modified copolymer of ethylene and propylene, styrenic copolymer (including styrenic block copolymer and randomly distributed styrenic copolymer, such as styrene-isobutylene copolymer and styrene-butadiene copolymer), partially or fully hydrogenated styrene-butadiene-styrene block copolymers such as styrene-(ethylene-propylene)-styrene or styrene-(ethylene-butylene)-styrene block copolymers, partially or fully hydrogenated styrene-butadiene-styrene block copolymers with functional group, polymers based on ethylene-propylene-(diene), polymers based on functionalized ethylene-propylene-diene), dynamically vulcanized polypropylene/ethylene-propylene-diene-copolymer, thermoplastic vulcanizates based on ethylene-propylene-(diene), thermoplastic polyetherurethane, thermoplastic polyesterurethane, compositions for making thermoset polyurethane, thermoset polyurethane, natural rubber, styrene-butadiene rubber, nitrile rubber, chloroprene rubber, fluorocarbon rubber, butyl rubber, acrylic rubber, silicone rubber, chlorosulfonated polyethylene, polyisobutylene, alfin rubber, polyester rubber, epichlorphydrin rubber, chlorinated isobutylene-isoprene rubber, nitrile-isobutylene rubber, 1,2-polybutadiene, 1,4-polybutadiene, cis-polyisoprene, trans-polyisoprene, and polybutylene-octene.

Preferred materials for use as Component B include polyester elastomers marketed under the name PEBAX and LOTADER marketed by ATOFINA Chemicals of Philadelphia, Pa.; HYTREL, FUSABOND, and NUCREL marketed by E.I. DuPont de Nemours & Co. of Wilmington, Del.; SKYPEL and SKYTHANE by S.K. Chemicals of Seoul, South Korea; SEPTON and HYBRAR marketed by Kuraray Company of Kurashiki, Japan; ESTHANE by Noveon; and KRATON marketed by Kraton Polymers. A most preferred material for use as Component B is SEPTON HG-252

As stated above, Component C is a metal cation. These metals are from groups IA, IB, IIA, IIB, IIIA, IIIB, IVA, IVB, VA, VB, VIA, VIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal carbonates, or metal acetates. In addition to Components A, B, and C, other materials commonly used in polymer blend compositions, can be incorporated into compositions prepared using these methods, including: crosslinking agents, co-crosslinking agents, accelerators, activators, UV-active chemicals such as UV initiators, EB-active chemicals, colorants, UV stabilizers, optical brighteners, antioxidants, processing aids, mold release agents, foaming agents, and organic, inorganic or metallic fillers or fibers, including fillers to adjust specific gravity.

Various known methods are suitable for preparation of polymer blends. For example, the three components can be premixed together in any type of suitable mixer, such as a V-blender, tumbler mixer, or blade mixer. This premix then can be melt-processed using an internal mixer, such as Banbury mixer, roll-mill or combination of these, to produce a reaction product of the anionic functional groups of Component A by Component C in the presence of Component B. Alternatively, the premix can be melt-processed using an extruder, such as single screw, co-rotating twin screw, or counter-rotating twin screw extruder, to produce the reaction product. The mixing methods discussed above can be used together to melt-mix the three components to prepare the compositions of the present invention. Also, the components can be fed into an extruder simultaneously or sequentially.

Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system. In this case, Components A and B can be fed into the extruder through a main hopper to be melted and well-mixed while flowing downstream through the extruder. Then Component C can be fed into the extruder to react with the mixture of Components A and B between the feeding port for component C and the die head of the extruder. The final polymer composition then exits from the die. If desired, any extra steps of melt-mixing can be added to either approach of the method of the present invention to provide for improved mixing or completion of the reaction between A and C. Also, additional components discussed above can be incorporated either into a premix, or at any of the melt-mixing stages. Alternatively, Components A, B, and C can be melt-mixed simultaneously to form in-situ a pseudo-crosslinked structure of Component A in the presence of Component B, either as a fully or semi-interpenetrating network.

In addition to the polyalkenamer rubber/polyamide composition, or polyalkenamer rubber composition, the core, cover layer and, optionally, one or more inner cover layers golf ball may further comprise one or more ionomer resins. One family of such resins were developed in the mid-1960's, by E.I. DuPont de Nemours and Co., and sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, all of which many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a metal selected from the group consisting of zinc, sodium, lithium, calcium, magnesium, and combinations thereof.

E/X/Y, where E is ethylene, X is a softening comonomer such as present in an amount of from 0 wt. % to about 50 wt. % of the polymer, and Y is present in an amount from about 5 wt. % to about 35 wt. % of the polymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having molecular weight of about 80,000 to about 500,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, magnesium, and a mixture of any these; and b) a low molecular weight component having a molecular weight of about from about 2,000 to about 30,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with metal ions selected from the group consisting of lithium, sodium, zinc, calcium, magnesium, and a mixture of any of these; and b) from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having molecular weight of about 80,000 to about 500,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with metal ions selected from the group consisting of lithium, sodium, zinc, calcium, potassium, magnesium, and a mixture of any of these; and b) a low molecular weight component having a molecular weight of about from about 2,000 to about 30,000 and comprising one or more ethylene/$\alpha$, $\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with metal ions selected from the group consisting of lithium, sodium, zinc, calcium, potassium, magnesium, and a mixture of any of these; and c) from about 5 to about 40 weight percent (based on the total weight of said modified ionomeric polymer) of one or more fatty acids or metal salts of said fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_X COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($C_{18}$, i.e., $CH_3 (CH_2)_{16} COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{13}$, i.e., $CH_3 (CH_2)_7 CH:CH(CH_2)_7 COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

A preferred ionomer composition may be prepared by blending one or more of the unimodal ionomers, bimodal ionomers, or modified unimodal or bimodal ionomeric polymers as described herein, and further blended with a zinc neutralized ionomer of a polymer of general formula E/X/Y where E is ethylene, X is a softening comonomer such as acrylate or methacrylate and is present in an amount of from 0 to about 50, preferably 0 to about 25, most preferably 0, and Y is acrylic or methacrylic acid and is present in an amount from about 5 wt. % to about 25, preferably from about 10 to about 25, and most preferably about 10 to about 20 wt % of the total composition.

The polyalkenamer rubber/polyamide compositions, or polyalkenamer rubber composition, used to prepare the golf balls can also incorporate one or more fillers. Such fillers are typically in a finely divided form, for example, in a size generally less than about 20 mesh, preferably less than about 100 mesh U.S. standard size, except for fibers and flock, which are generally elongated. Flock and fiber sizes should be small enough to facilitate processing. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten steel copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and U.S. Patent Publication No. 2004-0092336A1 published May 13, 2004 and U.S. Patent Publication No. 2005-0059756A1 published Mar. 17, 2005, the entire contents of each of which are herein incorporated by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly 1 nanometer (nm) thick and 100 to 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer, such as the polyalkenamer rubber/polyamide composition, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some cases, further penetration of the matrix polymer chains into the aggregate structure separates the platelets, and leads to a complete breaking up of the platelet's stacked structure in the aggregate and thus when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

As used herein, a "nanocomposite" is defined as a polymer matrix having nanofiller intercalated or exfoliated within the matrix. Physical properties of the polymer will change with the addition of nanofiller and the physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans. uses a 3% to 5% clay loading and has a tensile strength of 11,800 psi and a specific gravity of 1.14, while a conventional 30% mineral-filled material has a tensile strength of 8,000 psi and a specific gravity of 1.36. Because use of nanocomposite materials with lower loadings of inorganic materials than conventional fillers provides the same properties, this use allows products to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

Preferably the nanofiller material is added to the polyalkenamer rubber/polyamide composition in an amount of from about 0.1% to about 20%, preferably from about 0.1% to about 15%, and most preferably from about 0.1% to about 10% by weight of nanofiller reacted into and substantially dispersed through intercalation or exfoliation into the structure of the polyalkenamer/polyamide composition.

If desired, the various polymer compositions used to prepare the golf balls can additionally contain other additives such as plasticizers, pigments, antioxidants, U.V. absorbers, optical brighteners, or any other additives generally employed in plastics formulation or the preparation of golf balls.

Another particularly well-suited additive for use in the presently disclosed compositions includes compounds having the general formula:

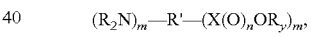

$(R_2N)_m$—$R'$—$(X(O)_nOR_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. Provisional Patent Application No. 60/588,603, filed on Jul. 16, 2004, the entire contents of which are herein incorporated by reference. These materials include caprolactam, oenantholactam, decanolactam, undecanolactam, dodecanolactam, caproic 6-amino acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine)carbamate and ammonium carbamate.

Most preferably the material is selected from the group consisting of 4,4'-methylene-bis-(cyclohexylamine)carbamate (commercially available from R.T. Vanderbilt Co., Norwalk, Conn. under the tradename Diak® 4), 11-aminoundecanoicacid, 12-aminododecanoic acid, epsilon-caprolactam; omega-caprolactam, and any and all combinations thereof.

In an especially preferred embodiment a nanofiller additive component in the golf ball is surface modified with a compatibilizing agent comprising the earlier described compounds having the general formula:

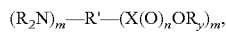

$(R_2N)_m\text{—}R'\text{—}(X(O)_nOR_y)_m,$

A most preferred embodiment would be a filler comprising a nanofiller clay material surface modified with an amino acid including 12-aminododecanoic acid. Such fillers are available from Nanonocor Co. under the tradename Nanomer 1.24TL.

Golf Ball Composition and Construction

Referring to the drawing in FIG. 1, there is illustrated a golf ball 1, which comprises a solid center or core 2, which may be formed as a solid body of the herein described composition and in the shape of the sphere.

The core of the balls may have a diameter of from about 0.5 to about 1.62, preferably from about 0.7 to about 1.60, more preferably from about 1 to about 1.58, yet more preferably from about 1.20 to about 1.54, and most preferably from about 1.40 to about 1.50 in.

The core of the balls also may have a PGA compression of from about 30 to about 200, preferably from about 35 to about 185, more preferably from about 45 to about 180, and most preferably from about 50 to about 120. In another embodiment, the core of the balls may have a PGA compression of from about 30 to about 100, preferably from about 35 to about 90, more preferably from about 40 to about 80.

In one embodiment the core may comprise the injection moldable polyalkenamer rubber composition or polyalkenamer/polyamide composition in the center and optionally, one or more core layers disposed around the center. These core layers may be made from the same polyalkenamer rubber composition or polyalkenamer/polyamide composition as used in the center portion, or may be a different thermoplastic elastomer.

The various core layers (including the center) may each exhibit a different hardness. The difference between the center hardness and that of the next adjacent layer, as well as the difference in hardness between the various core layers may be greater than 2, preferably greater than 5, most preferably greater than 10 units of Shore D.

In one preferred embodiment, the hardness of the center and each sequential layer increases progressively outwards from the center to outer core layer.

In another preferred embodiment, the hardness of the center and each sequential layer decreases progressively inwards from the outer core layer to the center.

Intermediate Layer(s) and Cover Layer

Again referring to the drawing in FIG. 1, there is illustrated a golf ball 1, which comprises a solid center or core 2, which may be formed as a solid body of the herein described composition and in the shape of the sphere, an intermediate layer 3, disposed on the spherical core and an outer cover layer 4.

The golf ball may comprise from 0 to 5, preferably from 0 to 3, more preferably from 1 to 3, most preferably 1 to 2 intermediate layer(s).

In one preferred embodiment, at least one of the intermediate layers comprises the novel blend compositions described herein.

In one preferred embodiment, the golf ball is a three-piece ball with the injection moldable polyalkenamer/polyamide composition, or polyalkenamer rubber composition, used in the intermediate or mantle layer. In a more preferred embodiment the three-piece ball has an injection moldable polyalkenamer/polyamide composition, or polyalkenamer rubber composition, used in the intermediate or mantle layer and a cover comprising a thermoplastic elastomer, a thermoplastic or thermoset polyurethane or an ionomer.

In another preferred embodiment, the golf ball is a four-piece ball with the injection moldable polyalkenamer/polyamide composition, or polyalkenamer rubber composition, used in one of the two intermediate or mantle layers in the golf ball. In a more preferred embodiment the four-piece ball has an injection moldable polyalkenamer/polyamide composition, or polyalkenamer rubber composition, used in the inner mantle or intermediate layer. In an especially preferred embodiment, the four-piece ball has an injection moldable polyalkenamer/polyamide composition, or polyalkenamer rubber composition, used in the inner mantle or intermediate layer and a cover comprising a thermoplastic elastomer, a thermoplastic or thermoset polyurethane or an ionomer.

In another preferred embodiment, the golf ball is a four-piece ball with the injection moldable polyalkenamer/polyamide composition, or polyalkenamer rubber composition, used in one of the two intermediate or mantle layers in the golf ball. In a more preferred embodiment the four-piece ball has an injection moldable polyalkenamer/polyamide composition, or polyalkenamer rubber composition, used in the outer mantle or outer intermediate layer. In an especially preferred embodiment, the four-piece ball has an injection moldable polyalkenamer/polyamide composition, or polyalkenamer rubber composition, used in the outer mantle or outer intermediate layer and a cover comprising a thermoplastic elastomer, a thermoplastic or thermoset polyurethane or an ionomer.

The one or more intermediate layers of the golf balls may have a thickness of about 0.01 to about 0.50 or about 0.01 to about 0.20, preferably from about 0.02 to about 0.30 or from about 0.02 to about 0.15, more preferably from about 0.03 to about 0.20 or from about 0.03 to about 0.10, and most preferably from about 0.03 to about 0.10 or about 0.03 to about 0.06 in.

The one or more intermediate layers of the golf balls also may have a hardness greater than about 25, preferably greater than about 30, more preferably greater than about 40, and most preferably greater than about 50, Shore D units.

The one or more intermediate layers of the golf balls may also have a flexural modulus from about 5 to about 500, preferably from about 15 to about 400, more preferably from about 20 to about 300, still more preferably from about 25 to about 200, and most preferably from about 30 to about 100 kpsi.

The cover layer of the balls may have a thickness of about 0.01 to about 0.10, preferably from about 0.02 to about 0.08, more preferably from about 0.03 to about 0.06 in.

The cover layer the balls may have a hardness Shore D from about 40 to about 70, preferably from about 45 to about 70 or about 50 to about 70, more preferably from 47 to about 68 or about 45 to about 70, and most preferably from about 50 to about 65.

The COR of the golf balls may be greater than about 0.760, preferably greater than about 0.780, more preferably greater than 0.790, most preferably greater than 0.795, and especially greater than 0.800 at 125 ft/sec inbound velocity. In another embodiment, the COR of the golf balls may be greater than about 0.760, preferably greater than about 0.780, more preferably greater than 0.790, most preferably greater than 0.795, and especially greater than 0.800 at 143 ft/sec inbound velocity.

As described below in more detail, spheres of the polyalkenamer/polyamide compositions may be made for the purposes of evaluating their property performance. The compositions formed into such spheres can have a PGA compression of from about 30 to about 200, preferably from about 35 to about 185, more preferably from about 45 to about 180; a hardness Shore D from about 30 to about 85, preferably from about 40 to about 80, more preferably from about 40 to about 75; and a COR greater than about 0.700, preferably greater than 0.710, more preferably greater than about 0.720, and most preferably greater than 0.730 at 125 ft/sec inbound velocity. In another embodiment, the spheres can have a COR greater than about 0.780, preferably greater than 0.790, more preferably greater than about 0.795, and most preferably greater than 0.800 at 125 ft/sec inbound velocity.

The polyalkenamer/polyamide compositions may have a flexural modulus from about 5 to about 500, preferably from about 15 to about 400, more preferably from about 20 to about 300, still more preferably from about 25 to about 200, and most preferably from about 30 to about 150 or 100 kpsi; and a tensile elongation of at least about 10%, preferably at least about 20%, more preferably at least about 30%, and most preferably at least about 40%, at break.

Method of Making the Golf Balls

The polyalkenamer/polyamide composition or polyalkenamer rubber composition can be formed by any mixing methods. The polyalkenamer/polyamide composition or polyalkenamer rubber composition can be processed by any method such as profile-extrusion, pultrusion, extrusion, compression molding, transfer molding, injection molding, cold-runner molding, hot-runner molding, reaction injection molding or any combination thereof. The polyalkenamer/polyamide composition can be a blend of polyalkenamer and polyamide that is not subjected to any further crosslinking or curing, a blend that is subjected to crosslinking or curing; a blend that forms a semi- or full-interpenetrating polymer network (IPN) upon crosslinking or curing, or a thermoplastic vulcanizate blend. The composition can be crosslinked by any crosslinking method(s), such as, for example, applying thermal energy, irradiation, or a combination thereof. The crosslinking reaction can be performed during any processing stage, such as extrusion, compression molding, transfer molding, injection molding, post-curing, or a combination thereof. In one embodiment, the ability of the polyalkenamer/polyamide compositions, or polyalkenamer rubber composition, to be injection molded and cured either subsequently by compression molding or actually during the injection molding process itself provides considerable flexibility in manufacture of the individual golf ball components.

For instance, the polyalkenamer/polyamide compositions, or polyalkenamer rubber composition, including crosslinking agents, fillers and the like can be mixed together with or without melting them. Dry blending equipment, such as a tumble mixer, V-blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide selected. The molding cycle may have a single step of molding the mixture at a single temperature for fixed time duration.

For example one mode of preparation for the cores of the golf balls that comprise the polyalkenamer/polyamide composition, or polyalkenamer rubber composition, is to first mix the various core ingredients on a two-roll mill or by extrusion to form slugs of approximately 30-45 g and then compression mold in a single step at a temperature between 150 to 210° C. for times between 2 and 20 minutes (or 2 and 12 minutes), to both form the core and cure the polyalkenamer/polyamide composition, or polyalkenamer rubber composition.

Alternatively, the core may be formed by first injection molding the polyalkenamer/polyamide formulation, or polyalkenamer rubber composition, into a mold followed by a subsequent compression-molding step to complete the curing step. The curing time and conditions in this step would depend on the formulation of the polyalkenamer/polyamide composition, or polyalkenamer rubber composition, selected.

Alternatively, the core may be formed from the polyalkenamer/polyamide composition, or polyalkenamer rubber composition, in a single injection molding step in which the polyalkenamer/polyamide composition, or polyalkenamer rubber composition, is injection molded into a heated mold at a sufficient temperature to effect either partially of fully crosslinking the material to yield the desired core properties. If the material is partially cured, additional compression molding or irradiation steps may optionally be employed to complete the curing process to yield the desired core properties.

Similarly in both intermediate layer(s) and outer cover formation, the use of polyalkenamer/polyamide compositions, or polyalkenamer rubber composition, allows for considerable flexibility in the layer formation steps of golf ball construction.

For instance, finished golf balls may be prepared by initially positioning a solid preformed core in an injection-molding cavity followed by uniform injection of the intermediate or cover layer polyalkenamer/polyamide-containing composition, or polyalkenamer rubber composition, sequentially over the core, to produce layers of the required thickness and ultimately golf balls of the required diameter. Again use of a heated injection mold allows the temperature to be controlled sufficient to either partially of fully crosslink the material to yield the desired layer properties. If the material is partially cured, additional compression molding or irradiation steps may optionally be employed to complete the curing process to yield the desired layer properties.

Alternatively, the intermediate and/or cover layers may also be formed around the core or intermediate layer by first forming half shells by injection molding the polyalkenamer rubber/polyamide compositions, or polyalkenamer rubber composition, followed by a compression molding the half shells about the core or intermediate layer to effect the curing of the layers in the final ball.

Alternatively, the intermediate and/or cover layers may also be formed around the core or intermediate layer by first forming half shells by injection molding the polyalkenamer/polyamide compositions, or polyalkenamer rubber composition, again using a heated injection mold which allows the temperature to be controlled sufficient to either partially or fully crosslink the material to yield the desired half shell properties layer properties. The resulting fully or partially cured half shells may then be compression molded around the core or core plus intermediate layer. Again, if the half shell is partially cured, the additional compression molding or irradiation steps may optionally be tailored to complete the curing process to yield the desired layer properties.

Finally, outer or intermediate covers comprising the polyalkenamer/polyamide compositions, or polyalkenamer rubber composition, may also be formed around the cores using conventional compression molding techniques. Cover materials for compression molding may also be extruded or blended resins or castable resins.

In addition, if radiation is used as a cross-linking agent, then the mixture comprising the unsaturated polymer and other additives can be irradiated following mixing, during forming into a part such as the core, intermediate layer, or outer cover of a ball, or after forming such part.

The use of the novel blend compositions in the various components of a golf ball such as the core, intermediate layers and/or covers allows for increases in COR and modulus in the materials of construction while also improving the materials processability.

EXAMPLES

Examples are given below by way of illustration and not by way of limitation.

Polyalkenamer Rubber Compositions

The materials employed in the blend formulations in Table 1 were as follows:

VESTENAMER 8012 is a trademark of and commercially available from Huls AG of Marl, Germany, and through its distributor in the U.S., Creanova Inc. of Somerset, N.J., and is a trans-polyoctenamer having a trans-content of approximately 80% with a melting point of approximately 54° C.

Surlyn® 8140 is a grade of ionomer commercially available from DuPont, and is a zinc ionomer of an ethylene/methacrylic acid polymer.

Surlyn® 9120 is a grade of ionomer commercially available from DuPont, and is a zinc ionomer of an ethylene/methacrylic acid polymer.

BR40 is a cis-1,4-polybutadiene rubber made with a rare earth catalyst and commercially available from Enichem.

ZnO is a rubber grade zinc oxide purchased from Akrochem (Akron, Ohio).

ZDA are zinc diacrylates purchased commercially from Sartomer under the tradenames SR416, and SR638, which may be used interchangeably or in combination.

$BaSO_4$ is Poliwhite 200 barium sulfate purchased from Cinbar.

Varox 231-XL is 1,1-di(t-butylperoxy)-3,3,5-trimethyl-cyclohexane cross-linking initiator, (**40% active peroxide). This is commercially available from R.T. Vanderbilt and is made by Atofina.

Trigonox 145 is 2,5-Dimethyl-2,5-di(tert-butylperoxy) hexyne cross-linking initiator, (**45% active peroxide). This is commercially available from Akzo Nobel.

TAIC is triallyl isocyanurate, which is commercially available from Akrochem.

Nanomer 1.24TL is a surface treated clay nanofiller, commercially available from Nanonocor Co.

Color concentrate is $TiO_2$ with ionomer as binder.

The properties of Tensile Strength, Tensile Elongation, Flexural Strength, Flexural Modulus, PGA compression, COR, Shore D hardness on both the materials and the resulting ball were conducted using the test methods as defined below.

Core or ball diameter was determined by using standard linear calipers or size gauge. Core specific gravity was determined by electronic densimeter using ASTM D-792.

Compression is measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60. Initial velocity of a golf ball after impact with a golf club is governed by the United States Golf Association ("USGA"). The USGA requires that a regulation golf ball can have an initial velocity of no more than 250 feet per second±2% or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a perfectly or completely elastic collision and 0 being equivalent to a perfectly plastic or completely inelastic collision. Since a ball's COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646. Shore D hardness was measured in accordance with ASTM Test D2240. Hardness of a layer was measured on the ball, perpendicular to a land area between the dimples.

The ball performance may be determined using a Robot Driver Test, which utilized a commercial swing robot in conjunction with an optical system to measure ball speed, launch angle, and backspin after a golf ball is hit with a driver. In this test, a titanium driver is attached to a swing robot and the swing speed and power profile as well as tee location and club lie angle is setup to generate the following values using a Maxfli XS Tour golf ball as a reference:

Headspeed: 112 mph
Ballspeed: 160 mph
Launch Angle: 9 deg
Backspin: 3200 rpm

Then, the test ball is substituted for the reference ball and the corresponding values determined.

In order to demonstrate the injection moldability of the polyalkenamer-containing compositions a series of temperature versus viscosity curves were obtained using a Dynamic Mechanical Analyzer (DMA) and ASTM D4440 and these data are summarized in Table 1. As shown in Table 1, the viscosity of both a polyocetenamer (Vestenamer 8012) and a typical ionomer (Surlyn 8140) decreases with increasing temperature, as expected for thermoplastic materials. However, when compared with a typical synthetic polybutadiene-based rubber (BR40), the polyocetenamer exhibits about an order of magnitude lower viscosity, which makes it possible for melt processing (injection molding). The subsequent viscosity increase observed at temperature above 190° C. in the BR40 and polyalkenamer samples is caused by breakage of unsaturated double bonds and subsequent propagation of crosslinking.

When peroxide (as a mixture of Varox 231XL and Trigonox 145) is added, there is an acceleration of crosslinking and a rapid increases in viscosity with temperature is observed as a result if this crosslinking, as is shown by the data in Table 1. Also, as a result of this crosslinking reaction, the COR of the polyalkenamer is significantly improved, such that it is significantly higher than that of most, if not all commercially available ionomers.

TABLE 1

Viscosity of Selected Compositions

| Temperature (C.) | Viscosity (Pa-sec.) | | | | |
|---|---|---|---|---|---|
| | A | B | C | D | E |
| 75 | 19,360 | 2,949 | | 33,611 | 7,598 |
| 81 | 19,301 | 2,716 | | 32,240 | 6,960 |
| 85 | 19,537 | 2,493 | | 30,277 | 6,191 |
| 91 | 19,341 | 2,314 | | 27,873 | 5,702 |
| 95 | 19,363 | 2,126 | | 22,798 | 4,695 |
| 101 | 19,120 | 1,973 | | 19,290 | 4,186 |
| 105 | 19,059 | 1,826 | | 16,514 | 3,766 |
| 111 | 18,777 | 1,700 | | 16,987 | 3,643 |
| 115 | 18,682 | 1,580 | | 24,556 | 3,517 |
| 121 | 18,391 | 1,478 | | 29,696 | 3,456 |
| 125 | 18,251 | 1,379 | | 57,615 | 17,630 |
| 131 | 17,949 | 1,292 | | 73,539 | 36,344 |
| 135 | 17,768 | 1,211 | | 119,000 | 139,000 |
| 141 | 17,439 | 1,139 | | 142,000 | 206,000 |
| 145 | 17,158 | 1,069 | | 210,000 | 527,000 |
| 151 | 16,789 | 1,007 | | 243,000 | 747,000 |
| 155 | 16,405 | 946 | | 313,000 | 1,870,000 |
| 161 | 16,014 | 893 | | 329,000 | 2,500,000 |
| 165 | 15,579 | 844 | | 378,000 | 4,780,000 |
| 171 | 15,162 | 802 | | 418,000 | 5,710,000 |
| 175 | 14,557 | 762 | 1,295 | 614,000 | 9,000,000 |
| 181 | 14,139 | 732 | 976 | 726,000 | 10,000,000 |
| 185 | 14,266 | 714 | 880 | 1,080,000 | 9,580,000 |
| 191 | 14,563 | 690 | 745 | 1,240,000 | 7,730,000 |
| 195 | 15,593 | 696 | 665 | 1,590,000 | 5,680,000 |
| 201 | 15,960 | 692 | 544 | 1,670,000 | 5,400,000 |
| 205 | 17,215 | 782 | 483 | 1,780,000 | 4,870,000 |
| 211 | 17,779 | 806 | 404 | 1,760,000 | 4,820,000 |
| 215 | 19,740 | 933 | 369 | 1,780,000 | 5,060,000 |
| 220 | 22,167 | 1,084 | 315 | 1,750,000 | 4,620,000 |
| 226 | 23,276 | 1,263 | 288 | 1,760,000 | |
| 230 | 26,918 | 1,471 | 247 | 1,740,000 | |
| 235 | 31,265 | 1,703 | 225 | | |
| 240 | 36,071 | 1,951 | 193 | | |
| 245 | 41,343 | 2,217 | 174 | | |
| 250 | 47,049 | 2,497 | 151 | | |

A: BR40
B: Vestenamer 8012
C: Surlyn 8140
D: BR40-based compound including peroxide.
E: Vestenamer 8012-based compound including peroxide.

To further demonstrate the injection moldability of the polyalkenamer-containing compositions the frequency versus storage modulus (G') profiles of a polyoctenamer (Vestenamer 8012) and a typical synthetic polybutadiene-based rubber (BR40) were obtained using a Dynamic Mechanical Analyzer (DMA) and ASTM D4065, and ASTM D4440 at 25° C., and these data summarized in Table 2. Analysis of these data shows that when compared with a typical synthetic polybutadiene-based rubber (BR40), the polyocetenamer exhibits a significantly higher storage modulus (about two to three orders of magnitude higher) which results in processability sufficient for injection molding.

Three Piece Ball Examples

A series of three-piece (i.e., core, mantle, and cover) golf balls were prepared. The balls were prepared to have a 1.480 inch commercial polybutadiene rubber core made from a polybutadiene rubber (BR40) and further incorporating the crosslinkinking agents zinc diacrylate and peroxide and the filler zinc oxide, and prepared using traditional core compression molding techniques with a mold temperature of 180° C. and a cure time of 12 minutes. The resulting core physicals as summarized in Table 4. A mantle was injection molded over this core using compositions incorporating Vestenamer 8012, marketed by Degussa Corporation. The compositions also incorporated crosslinkinking agents zinc diacrylate and peroxide and the filler zinc oxide as summarized in Table 3. After the initial injection molding, the mantles were crosslinked in a compression mold at 180° C. for 12 minutes. A cover comprising a blend of 60 wt % Septon Hg252 and 40 wt % Surlyn 9120 was then injection molded over the mantle to yield a ball having the properties summarized in Table 4.

Analysis of the date in Table 4 demonstrates that three-piece balls of the present invention, while having a low compression and low hardness and thus having a soft feel or touch are also able to demonstrate excellent COR and hence excellent distance.

TABLE 2

Storage Modulus of BR40 Rubber and Vestenamer 8012

| | Storage Modulus, G' (dyn/cm$^2$) × 10$^5$ | |
|---|---|---|
| Frequency (Hz) | BR40 | Vestenamer 8012 |
| 80.000 | 67 | 5706 |
| 63.546 | 64 | 5632 |
| 50.477 | 62 | 5597 |
| 40.095 | 59 | 5572 |
| 31.849 | 57 | 5549 |
| 25.298 | 55 | 5530 |
| 20.095 | 53 | 5511 |
| 15.962 | 51 | 5491 |
| 12.679 | 49 | 5470 |
| 10.071 | 46 | 5447 |
| 8.000 | 44 | 5422 |
| 6.355 | 42 | 5398 |
| 5.048 | 40 | 5374 |
| 4.010 | 37 | 5349 |
| 3.185 | 35 | 5327 |
| 2.530 | 33 | 5303 |
| 2.010 | 31 | 5279 |
| 1.596 | 28 | 5260 |
| 1.268 | 26 | 5238 |
| 1.007 | 24 | 5214 |
| 0.800 | 22 | 5191 |
| 0.635 | 20 | 5167 |
| 0.505 | 19 | 5143 |
| 0.401 | 17 | 5118 |
| 0.318 | 15 | 5093 |
| 0.253 | 14 | 5068 |
| 0.201 | 13 | 5046 |
| 0.160 | 11 | 5028 |
| 0.127 | 10 | 5007 |
| 0.101 | 9 | 4988 |
| 0.080 | 8 | 4976 |
| 0.064 | 7 | 4970 |
| 0.050 | 7 | 4971 |
| 0.040 | 6 | 4974 |
| 0.032 | 5 | 4977 |
| 0.025 | 5 | 4987 |
| 0.020 | 4 | 4998 |
| 0.016 | 4 | 5011 |

TABLE 3

Three-Piece Ball Mantle Composition Data

| Mantle Compositions | A | B |
|---|---|---|
| Vestenamer 8012 | 100 | 100 |
| ZnO | 10 | 25 |
| ZDA (SR416) | 70 | 70 |
| Varox 231XL | 0.5 | 0.5 |
| Trigonox 145 | 0.14 | 0.14 |

* All values in pph

TABLE 4

Three-Piece Ball Physicals and Test Data

| | Ex 1 | Ex 2 | Ex 3 | Ex 4 |
|---|---|---|---|---|
| Core Composition | A | B | C | D |
| Diameter(in) | 1.420 | 1.480 | 1.420 | 1.480 |
| Core Physicals | | | | |
| Core Compression | 56 | 46 | 52 | 44 |
| COR | 0.827 | 0.82 | 0.83 | 0.823 |
| SpG | 1.131 | 1.121 | 1.087 | 1.104 |
| Mantle Composition | A | A | B | B |
| Diameter(in) | 1.600 | 1.600 | 1.600 | 1.600 |
| Thickness(in) | 0.090 | 0.060 | 0.090 | 0.060 |
| Mantled Core Physicals | | | | |
| Compression | 64 | 54 | 65 | 55 |
| Shore D Hardness | 49 | 51 | 50 | 52 |
| COR | 0.822 | 0.817 | 0.823 | 0.817 |
| Cover Composition | A | A | A | A |
| Thickness(in) | 0.04 | 0.04 | 0.04 | 0.04 |
| Ball Physicals | | | | |
| Compression | 69 | 66 | 70 | 66 |
| Shore D Hardness | 48 | 48 | 49 | 49 |
| COR @ 125 mph | 0.814 | 0.812 | 0.816 | 0.814 |

Four Piece Ball Examples

A series of four-piece (i.e., core, inner mantle, outer mantle, and cover) golf balls were prepared. The balls were prepared to have a 1.480 inch commercial polybutadiene rubber core made from a polybutadiene rubber (BR40) and further incorporating the crosslinkinking agents zinc diacrylate and peroxide and the filler zinc oxide, and prepared using traditional core compression molding techniques with a mold temperature of 180° C. and a cure time of 12 minutes. The resulting core physicals as summarized in Table 6. An inner mantle was injection molded over this core using compositions incorporating Vestenamer 8012, marketed by Degussa Corporation. The compositions also incorporated crosslinkinking agents zinc diacrylate and peroxide and the filler zinc oxide as summarized in Table 5. After the initial injection molding, the mantles were crosslinked in a compression mold at 180° C. for 12 minutes. An outer mantle comprising a Surlyn 9120 followed by a cover comprising a blend of 60 wt % Septon Hg252 and 40 wt % Surlyn 9120 were then sequentially injection molded over the inner mantle to yield a ball having the properties summarized in Table 6.

TABLE 5

Four-Piece Ball Mantle Composition Data

Inner Mantle Compositions*

|  | A | B | C | D | E | F | G | H | I | J |
|---|---|---|---|---|---|---|---|---|---|---|
| Vestenamer 8012 | 100 | 100 | 100 | 100 | 100 | 100 | 100 | 100 | 100 | 100 |
| ZnO |  |  | 20 | 20 |  |  |  | 20 | 20 |  |
| ZDA (SR416) |  | 80 | 70 | 70 | 60 | 60 | 50 | 60 | 60 | 80 |
| ZDA (SR638) | 70 |  |  |  |  |  |  |  |  |  |
| ZnPCTP |  | 1 |  |  |  |  |  |  |  |  |
| TAIC (triallyl isocyanurate) |  |  |  |  | 1 | 1 |  |  |  | 1 |
| Varox 231XL | 1.5 | 1.5 | 0.5 | 0.5 | 1.5 | 1.5 | 2.0 | 0.5 | 0.5 | 1.5 |
| Trigonox 145 |  |  | 0.14 | 0.14 |  |  |  | 0.14 | 0.14 |  |

*All values in pph

Analysis of the date in Table 6 demonstrate that four-piece balls of the present invention, while having a low compression and low hardness and thus having a soft feel or touch, are also able to demonstrate excellent COR and hence excellent distance.

strength of 11,900 psi, tensile strength at yield of 8,300 psi, and a tensile elongation of 150% at break.

GTR45 is commercially available from EMS Chemie and is a polyamide 61T having a glass transition temperature ($T_g$) of 127° C., specific gravity of 1.18, flexural modulus of 460

TABLE 6

Four-Piece Ball Physicals and Performance Data

|  | Ex 5 | Ex 6 | Ex 7 | Ex 8 | Ex 9 | Ex 10 | Ex 11 | Ex 12 | Ex 13 | Ex 14 |
|---|---|---|---|---|---|---|---|---|---|---|
| Polybutadiene core |  |  |  |  |  |  |  |  |  |  |
| Core Size | 1.480 | 1.480 | 1.480 | 1.480 | 1.480 | 1.480 | 1.480 | 1.480 | 1.480 | 1.480 |
| Core Compression | 57 | 57 | 65 | 49 | 63 | 53 | 53 | 68 | 57 | 49 |
| COR | 0.823 | 0.823 | 0.828 | 0.819 | 0.824 | 0.819 | 0.819 | 0.828 | 0.822 | 0.819 |
| SpG | 1.148 | 1.148 | 1.143 | 1.134 | 1.161 | 1.164 | 1.164 | 1.154 | 1.151 | 1.134 |
| Inner mantle Vestenamer-based compound |  |  |  |  |  |  |  |  |  |  |
| Diameter(in) | 1.580 | 1.580 | 1.580 | 1.580 | 1.580 | 1.580 | 1.580 | 1.580 | 1.580 | 1.580 |
| Thickness(in) | 0.050 | 0.050 | 0.050 | 0.050 | 0.050 | 0.050 | 0.050 | 0.050 | 0.050 | 0.050 |
| Outer mantle Ionomer-based compound |  |  |  |  |  |  |  |  |  |  |
| Diameter(in) | 1.62 | 1.62 | 1.62 | 1.62 | 1.62 | 1.62 | 1.62 | 1.62 | 1.62 | 1.62 |
| Thickness(in) | 0.020 | 0.020 | 0.020 | 0.020 | 0.020 | 0.020 | 0.020 | 0.020 | 0.020 | 0.020 |
| Cover Ionomer blend |  |  |  |  |  |  |  |  |  |  |
| Thickness(in) | 0.03 | 0.03 | 0.03 | 0.03 | 0.03 | 0.03 | 0.03 | 0.03 | 0.03 | 0.03 |
| Ball Physicals |  |  |  |  |  |  |  |  |  |  |
| Compression | 75 | 75 | 77 | 72 | 74 | 70 | 69 | 72 | 71 | 71 |
| Cover Hardness | 51 | 50 | 52 | 51 | 52 | 51 | 49 | 50 | 51 | 50 |
| COR @ 125 mph | 0.816 | 0.817 | 0.821 | 0.815 | 0.82 | 0.815 | 0.816 | 0.818 | 0.814 | 0.809 |

Polyalkenamer/Polyamide Compositions

The materials employed in the blend formulations in Table 7 were as follows:

VESTENAMER 8012 is a trademark of and commercially available from Huls AG of Marl, Germany, and through its distributor in the U.S., Creanova Inc. of Somerset, N.J., and is a trans-polyoctenamer having a trans-content of approximately 80% with a melting point of approximately 54° C.

GRILAMID TR90 is commercially available from EMS Chemie and is a copolymer of dodecanedioic acid with 4,4'-methylenebis(2-methylcyclohexanamine) (also known as cyclohexanamine, 4,4'-methylenebis(2-methylcyclohexanamine) having a glass transition temperature ($T_g$) of 155° C., specific gravity of 1.01, flexural modulus of 229 kpsi, flexural kpsi, flexural strength of 17,900 psi, and a tensile elongation of 135% at break.

Surlyn® 6120 is a grade of ionomer commercially available from DuPont, and is a zinc ionomer of an ethylene/methacrylic acid polymer.

The properties of Tensile Strength, Tensile Elongation, Flexural Modulus, PGA compression, COR, Shore D hardness on the materials were conducted using the test methods as defined below.

Tensile Strength was measured in accordance with ASTM Test D 368.

Tensile Elongation was measured in accordance with ASTM Test D 368.

Flexural Modulus was measured in accordance with ASTM Test D 790.

Compression is measured by applying a spring-loaded force to the sphere to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

Initial velocity of a golf ball after impact with a golf club is governed by the United States Golf Association ("USGA"). The USGA requires that a regulation golf ball can have an initial velocity of no more than 250 feet per second±2% or 255 feet per second. The USGA initial velocity limit is related to the ultimate distance that a ball may travel (280 yards±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a perfectly or completely elastic collision and 0 being equivalent to a perfectly plastic or completely inelastic collision. Since a ball's COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

Shore D hardness was measured in accordance with ASTM Test D2240.

The compositions described herein can be prepared by using a twin screw extruder with or without pre-mixing prior to charging to the extruder. The barrel temperature for the blending may be between about 140° C. to about 300° C., more preferably between about 160° C. to about 280° C., and most preferably between about 180° C. to about 260° C. The compounded material can be positioned readily around a golf ball core using injection molding. The barrel temperature for the injection molding may be between about 160° C. to about 280° C., more preferably between about 180° C. to about 260° C., and most preferably between about 200° C. and 260° C.

The blends were prepared by using a twin screw extruder with or without pre-mixing prior to charging to the extruder. The barrel temperature for the blending was Feed Zone 50° C., Barrel Zones 200° C. and Die Zone 255° C. Test specimens were made from the blends by injection molding. Spheres were made from the blends by injection molding. The blend ingredient amounts are shown in parts per hundred (pph).

TABLE 7

|  | A | B | C | D | E | F | G | H | I | J |
|---|---|---|---|---|---|---|---|---|---|---|
| Material Composition | | | | | | | | | | |
| TR90 | 100 | 100 | 100 | 100 | 100 | | | | | |
| GTR45 | | | | | | 100 | 100 | 100 | | |
| Vestenamer 8012 | | 10 | 15 | 20 | 30 | 10 | 20 | | | 100 |
| Surlyn 6120 | | | | | | | | | 100 | |
| Specimen Properties | | | | | | | | | | |
| Tensile Strength (psi) | 6460 | 5595 | | | | 6749 | | 8008 | 4815 | 887 |
| Tensile Elongation (%) | 50 | 115 | | | | 30 | | 42 | 113 | 75 |
| Flexural Modulus (kpsi) | 197 | 184 | | | | 320 | | 375 | 69 | 24 |
| Sphere Properties* | | | | | | | | | | |
| Shore D Hardness | 80 | 72 | 71 | 70 | 68 | 80 | 74 | 86 | 68 | 42 |
| Compression | 173 | 176 | 176 | 174 | 171 | 182 | 179 | 184 | 159 | 109 |
| COR | 0.829 | 0.799 | 0.785 | 0.768 | 0.736 | 0.803 | 0.763 | 0.86 | 0.758 | 0.576 |

The results in Table 7 demonstrate that the toughness (durability) of polyamide has been significantly improved by blending with a trans-polyoctenamer. As seen in Table 7, addition of a trans-polyoctenamer increases tensile elongation (TE) from 50% (composition A) to 115% (composition B), which is nearly the same TE as Surlyn 6120 (composition I). In addition, a composition that includes only polyamide (composition A) had a Shore D hardness of 80, but adding a polyoctenamer to the composition (compositions B, C, D and E) advantageously reduced the Shore D hardness while unexpectedly maintaining the COR in a suitable range. Moreover, the ionomer composition (composition I) exhibited a COR of 0.758 which is considered in the art to be a superior result. Surprisingly, the non-ionomer blends (compositions B, C, D, G and H) advantageously resulted in higher CORs compared to the ionomer composition (composition I).

In view of the many possible embodiments to which the principles of this disclosure may be applied, it should be recognized that the illustrated embodiments are only preferred examples and should not be taken as limiting the scope of the invention.

We claim:

1. A golf ball comprising:
   (a) a core comprising a center;
   (b) an outer cover layer; and
   (c) one or more intermediate layers;
   wherein at least one of the core, or the intermediate layer comprises a composition that includes at least one polyalkenamer and at least one polyamide, wherein the polyamide comprises a polyamide elastomer.

2. The golf ball of claim 1, wherein the composition comprises an injection moldable rubber composition that includes at least one polyalkenamer and at least one polyamide.

3. The golf ball of claim 1, wherein the polyamide elastomer comprises a thermoplastic copolyamide.

4. The golf ball of claim 3, wherein the thermoplastic copolyamide comprises a polyether amide elastomer or a polyetherester amide elastomer.

5. The golf ball of claim 3, wherein the thermoplastic copolyamide comprises polyamide 12 as a polyamide segment.

6. The golf ball of claim 1, wherein the polyamide is a major ingredient of the composition.

7. A golf ball according to claim 1, wherein the composition comprises about 10 to about 98 wt % polyamide and about 2 to about 90 wt % polyalkenamer, based on the final weight of the composition.

8. The golf ball according to claim 7, wherein the composition comprises about 40 to about 90 wt % polyamide and about 10 to about 60 wt % polyalkenamer, based on the final weight of the composition.

9. The golf ball of claim 1, wherein the polyamide elastomer comprises a reaction product of copolycondensation of at least one polyamide block having reactive chain ends with at least one polyether block having reactive chain ends selected from:
   (a) a polyamide block having a diamine chain end with a polyoxyalkylene sequence of dicarboxylic chains;
   (b) a polyamide block having dicarboxylic acid chain ends with a polyoxyalkylene sequence having diamine chain ends obtained by cyanoethylation and hydrogenation of polyoxyalkylene alpha-omega dihydroxylated aliphatic sequences;
   (c) a polyamide block of dicarboxylic chain ends with polyether diols; or
   (d) any combination or mixture thereof.

10. The golf ball of claim 1, wherein the polyamide elastomer comprises a reaction product of polycondensation of the components:
   (a) a diamine and a dicarboxylate, lactame or an amino dicarboxylic acid;
   (b) a polyoxyalkylene glycol; and
   (c) an aromatic dicarboxylic acid.

11. The golf ball of claim 1, comprising an inner intermediate layer comprising a polyalkenamer rubber composition, and an outer intermediate layer comprising the composition that includes the at least one polyalkenamer and the at least one polyamide elastomer.

12. A four piece golf ball comprising:
   (a) a core comprising a center;
   (b) an outer cover layer;
   (c) an inner intermediate layer comprising a unimodal ionomer, a bimodal ionomer, a modified unimodal ionomer, a modified bimodal ionomer, a polyalkenamer; or any and all combinations or mixtures thereof; and
   (d) an outer intermediate layer comprising an injection moldable composition comprising at least one polyalkenamer and at least about 10 weight percent of at least one polyamide, based on the total polymer amount of the outer intermediate layer.

13. The golf ball of claim 12, wherein the injection moldable composition comprises at least about 60 weight percent polyamide.

14. The golf ball of claim 12, wherein the outer cover layer comprises a thermoplastic elastomer, a thermoset polyurethane, a thermoplastic polyurethane, a unimodal ionomer, a bimodal ionomer, a modified unimodal ionomer, a modified bimodal ionomer; or any and all combinations or mixtures thereof.

15. The golf ball of claim 12, wherein the outer cover layer comprises:
   A) one or more triblock copolymers; or
      one or more hydrogenation products of the triblock copolymers; or
      one or more hydrogenated diene block copolymers; or
      mixtures thereof;
      wherein each triblock copolymer has
         (i) a first polymer block comprising an aromatic vinyl compound,
         (ii) a second polymer block comprising a conjugated diene compound, and
         (iii) a hydroxyl group located at a block copolymer,
      wherein each hydrogenated diene block copolymer has a polystyrene-reduced number-average molecular weight of from 50,000 to 600,000 and is a hydrogenation product of
         (i) an A-B block copolymer, in which A is an alkenyl aromatic compound polymer block, and B is either
            (1) a conjugated diene homopolymer block, wherein the vinyl content of the conjugated diene portion is more than 60%, or
            (2) an alkenyl aromatic compound-conjugated diene random copolymer block wherein the vinyl content of the conjugated diene portion is 15-60%, or
         (ii) an A-B-C block copolymer, in which A and B are as defined above and C is an alkenyl aromatic compound-conjugated diene copolymer tapered block, wherein the proportion of the alkenyl aromatic compound increases gradually, or
         (iii) an A-B-A block copolymer, in which A and B are as defined above,
      and wherein in each of the hydrogenated diene block copolymers, the weight proportion of the alkenyl aromatic compound to conjugated diene is from 5/95 to 60/40, the content of the bound alkenyl aromatic compound in at least one block A is at least 3% by weight, the total of the bound alkenyl aromatic compound contents in the two block A's or the block A and the block C is 5% to 25% by weight based on the total monomers, and at least 80% of the double bond unsaturations of the conjugated diene portion is saturated by the hydrogenation; and
   B) one or more ionomers.

16. The golf ball of claim 12, wherein the outer cover layer comprises the reaction product of:
- at least one component A comprising a monomer, oligomer, or prepolymer, or polymer comprising at least 5% by weight of at least one type of functional group;
- at least one component B comprising a monomer, oligomer, prepolymer, or polymer comprising less by weight of anionic functional groups than the weight percentage of anionic functional groups of the at least one component A; and
- at least one component C comprising a metal cation,
- wherein the reaction product comprises a pseudo-crosslinked network of the at least one component A in the presence of the at least one component B.

17. The golf ball of claim 12, wherein the inner intermediate layer comprises a unimodal ionomer, a bimodal ionomer, a modified unimodal ionomer, a modified bimodal ionomer; or any and all combinations or mixtures thereof.

18. The golf ball of claim 12, wherein the core comprises a polybutadiene, the outer cover layer comprises a polyurethane, and the inner intermediate layer comprises a unimodal ionomer.

19. The golf ball of claim 13, wherein the core comprises a polybutadiene, the outer cover layer comprises a polyurethane, and the inner intermediate layer comprises a unimodal ionomer.

20. The golf ball of claim 12, wherein the polyamide comprises a polyamide elastomer.

21. The golf ball of claim 20, wherein the polyamide elastomer comprises a polyether amide elastomer or a polyether-ester amide elastomer.

22. A method for making a golf ball comprising a core, one or more intermediate layers and an outer cover layer, wherein the method comprises:
- forming a blend comprising at least one polyalkenamer rubber and at least one polyamide, wherein the polyamide comprises a polyamide elastomer; and
- injection molding the blend into a spherical mold to form the intermediate layer.

23. The method of claim 22, further comprising maintaining the mold at a temperature such that essentially no crosslinking of the polyalkenamer rubber and polyamide occurs; and
- compression molding the layer resulting from the injection molding at a time, temperature and pressure sufficient to effect the desired degree of crosslinking or annealing of the polyalkenamer rubber.

24. The method of claim 22, further comprising maintaining the mold at a temperature such that a desired degree of crosslinking or annealing of the polyalkenamer rubber and polyamide occurs.

25. The method of claim 22, wherein the polyamide elastomer comprises a polyether amide elastomer or a polyether-ester amide elastomer.

26. The method of claim 22, wherein at least about 60 weight percent of the at least one polyamide is included in the blend, based on the total polymer amount of the blend.

27. A four piece golf ball comprising:
- (a) a core comprising a center;
- (b) an outer cover layer;
- (c) an inner intermediate layer comprising a composition that includes at least one polyalkenamer and at least about 10 weight percent of at least one polyamide elastomer, based on the total polymer amount of the inner immediate layer; and
- (d) an outer intermediate layer comprising a unimodal ionomer, a bimodal ionomer, a modified unimodal ionomer, a modified bimodal ionomer; a polyalkenamer; or any and all combinations or mixtures thereof.

28. The golf ball of claim 27, wherein the polyalkenamer in the inner intermediate layer comprises a polyoctenamer.

29. The golf ball of claim 27, wherein the outer intermediate layer is made from an injection moldable composition that contains 60 to 100 wt % of the polyalkenamer, based on the final weight of the injection moldable composition.

* * * * *